US010274354B2

(12) United States Patent
Toma et al.

(10) Patent No.: US 10,274,354 B2
(45) Date of Patent: Apr. 30, 2019

(54) APPARATUS, SYSTEM AND METHOD FOR USE IN DETERMINING A PROPERTY OF A FLOWING MULTIPHASE FLUID

(71) Applicant: GLIMS Technology Ltd., Vancouver (CA)

(72) Inventors: Peter Toma, Saanichton (CA); Maxim Fischer, Saanichton (CA); Ross Waters, Vancouver (CA)

(73) Assignee: GLIMS TECHNOLOGY LTD. (CA)

( * ) Notice: Subject to any disclaimer, the term of this patent is extended or adjusted under 35 U.S.C. 154(b) by 112 days.

(21) Appl. No.: 15/492,444

(22) Filed: Apr. 20, 2017

(65) Prior Publication Data

US 2018/0306626 A1 Oct. 25, 2018

(51) Int. Cl.
| | | |
|---|---|---|
| *G01F 15/00* | (2006.01) | |
| *E21B 47/10* | (2012.01) | |
| *G01F 1/36* | (2006.01) | |
| *G01F 1/40* | (2006.01) | |
| *G01F 1/74* | (2006.01) | |
| *G01F 15/02* | (2006.01) | |
| G01F 25/00 | (2006.01) | |

(52) U.S. Cl.
CPC ............. *G01F 15/00* (2013.01); *E21B 47/10* (2013.01); *G01F 1/363* (2013.01); *G01F 1/40* (2013.01); *G01F 1/74* (2013.01); *G01F 15/02* (2013.01); *G01F 25/0007* (2013.01)

(58) Field of Classification Search
CPC ... G01F 1/36; G01F 1/363; G01F 1/40; G01F 1/74; G01F 15/00; G01F 15/0001; G01F 25/00; G01F 25/0007
USPC ..................................... 73/198, 861, 861.04
See application file for complete search history.

(56) References Cited

U.S. PATENT DOCUMENTS

| | | | | |
|---|---|---|---|---|
| 3,295,357 A | * | 1/1967 | Halpine | .............. G01F 25/0015 |
| | | | | 15/104.063 |
| 6,155,102 A | | 12/2000 | Toma et al. | |
| 6,629,447 B1 | * | 10/2003 | Collins | .............. G01F 25/0007 |
| | | | | 73/1.16 |

OTHER PUBLICATIONS

Mehdizadeh, P. and Williamson, J. (May 13, 2004) "Proposed Guidelines for Qualification of Multiphase Metering Systems for Well Testing." Document for Alaska Oil & Gas Conservation Commission (State of Alaska).

(Continued)

*Primary Examiner* — Benjamin R Schmitt
(74) *Attorney, Agent, or Firm* — Rodman & Rodman LLP; Kirsten M. Oates

(57) ABSTRACT

An apparatus, system, and method for use in determining at least one property of a flowing multiphase fluid involves comparing an initial signal and a pair of local reference signals with a set of flow characteristics extracted from reference sensor feature maps wherein the signals are related to the flow of the multiphase fluid as it passes through a flow passage which is continuously monitored, adjusted, and calibrated. Based upon the comparison, a decision is made to either resume monitoring of the flowing multiphase fluid by using a pair of local reference signals which are closely positioned and defined, or to adjust the flow passage area significantly in order to improve metering flow conditions. The invention is best suited for determining transport flow velocity and gas void fraction or relative proportions of the gas phase and the liquid phase within the multiphase fluid which subsequently can be used to quantify gas and liquid flowrates.

10 Claims, 10 Drawing Sheets

(56) References Cited

OTHER PUBLICATIONS

Toma, P. et. al. (May 2007) "Prediction of slug-to-annular flow-pattern transition," SPE Prod & Operations, pp. 339-346; see also Special Review: as JPT, May 2007 pp. 61-62.
Zeghloul, A. et al. (May 2015) "Interrogating the effect of an orifice on the upward two-phase-gas-liquid flow behavior," Int. J. Multiphase Flow (Elsevier Ltd., 74, pp. 96-105).

* cited by examiner

APPARATUS, SYSTEM AND METHOD FOR USE IN DETERMINING A PROPERTY OF A FLOWING MULTIPHASE FLUID

TECHNICAL FIELD

The present invention relates to an apparatus, system, and method for use in determining a property of a flowing multiphase fluid.

BACKGROUND OF THE INVENTION

A multiphase fluid is a fluid having more than one phase, such as a fluid having two or more liquid phases or a combination of a gas phase with one or more liquid phases. Flowing multiphase fluids are frequently encountered in industry and it is often necessary or desirable to have the ability to determine their flowing properties as well as flowrates of individual fluids. Unfortunately, however, determining the flowing properties of a multiphase fluid can be difficult for various reasons. Gravity leading to local phase separations, inertia leading to flow detachment and phase separation, and interfacial friction, as well as non-equilibrium gas exhoution phenomena occurring within the body of a metering device, affect the ability to obtain reliable and consistent measurements of the flowing properties of multiphase fluids when single phase fluid measurement apparatus and techniques are used.

As a result, there are several conventional approaches to determining the flowing properties of multiphase fluids. For example, some efforts have used Bernoulli's equation to determine the mass flowrate of a multiphase fluid by measuring pressure differentials between different locations in a relatively long conduit. Other efforts involve direct phase density metering which uses a concentrated beam of a specified radiation wavelength exhibiting a specific absorption coefficient for each phase. Various other problems arising with conventional metering devices and methods may include limited application for a specific gas and liquid flow range; gas exhoution (indicated as gas previously dissolved in liquid being released in the body of the metering device) leading to errors in calculating densities of the phases due to non-equilibrium gas-liquid dissolution; and ineffectiveness or inaccuracies in determining flow characteristics of each of the gas and liquid phases.

Pipe transportation of a multiphase fluid is typically encountered in the oil and gas industry and power systems handling vapors and condensate. The current method for measuring the total (gas and liquid) transported flowrate and phase ratios of a multiphase fluid involves initially separating the phases using a separator tank, and then metering each separated phase individually. However, this method does not provide real-time, continuous information on flowrates and phase ratios of simultaneously produced oil, gas, and water originating from numerous wells. Typically, produced fluids (i.e., gas and liquid) from only a single well at a time are directed to the separator tank, while produced fluids from other wells must bypass the separator tank to be directed to the field main fluid collector system. Accordingly, there is a need in the art for improved apparatus and methods of mitigating these problems.

SUMMARY OF THE INVENTION

The present invention relates to an apparatus, system, and method for use in determining at least one property of a flowing multiphase fluid by comparing an initial signal and a pair of local reference signals with a set of reference sensor maps, wherein the signals are related to the flow of the multiphase fluid as it passes through a flow passage which is continuously monitored, adjusted, and tailored. Based upon the comparison, a decision is made to either resume monitoring of the flowing multiphase fluid by using a pair of local reference signals obtained from two well defined, consecutive, flow passage minor area adjustments or by significantly changing the flow passage area to attain the desired metering flow conditions. The invention is best suited for determining transport flow velocity and gas void fraction or relative proportions of the gas phase and the liquid phase within the multiphase fluid and subsequently gas and liquid flowrates. It was surprisingly discovered that by conducting the method of the present invention, one or more of the following benefits may be realized:

(1) Compared to conventional flow metering methods, the invention does not require use of a separator tank to separate the phases before metering, and provides real-time, continuous, on-line monitoring and metering to determine a property of the flowing multiphase fluid.

(2) In the method form of the invention, it can be determined whether an initial measurement of a property of the flowing multiphase fluid lies in a suitable metering condition by obtaining a set of corresponding measurements for a pair of local metered references for comparative assessment. The local reference metered conditions are set by slightly altering the metering area by finely adjusting the position of a movable flow diverter within the metering flow area from its "home" position to positions proximate the "home" position, such that the "home" position is median between the local positions or coincides with one of the pair positions. Although the metering flow area (hence, gas-liquid transport velocity) may be slightly altered, the composition of the multiphase fluid and its flowrate are only negligibly altered. In contrast, conventional flow control valves operate between only "fully open" or "fully closed" positions to change the flowrate and input-output pressure drop, and use set point values to maintain a target flowrate. This invention thus does not equate to a conventional flow control valve since the purpose of moving the flow diverter in the optimal measurement zone is not to alter the flow rate.

(3) The measurements are validated and determined to be acceptable by comparison with a set of sensor feature maps. The set of sensor feature maps preferably comprises at least one sensor feature map representing each signal as a function of the property of the flowing multiphase fluid which is to be determined. Where the method includes the steps of deriving parameters from the signals, the set of sensor feature maps preferably comprises at least one sensor feature map for each parameter as a function of the property of the flowing multiphase fluid which is to be determined. The set of sensor feature maps may also comprise a set of graphs or correspondent analytical equations in which the property is expressed either as a function of the signal or of a parameter derived from the signal. If it is determined that the measurements are acceptable, metering is maintained at such established metering conditions as long as the input flow conditions do not significantly change. If it is determined that the measurements are unacceptable, a "search" is triggered for better metering flow conditions, assessed by a second pair of local reference positions of the movable flow diverter. The metering flow area is changed significantly by sizably displacing the movable flow diverter to a "new" home position. Through successive repeated pair measurements, the metering flow area can be precisely adjusted to maintain suitable metering conditions.

(4) Although the total amount of time for metering at one position is short (about 10 seconds to about 60 seconds), measurable parameters and sufficient data are generated.

(5) Using the method form of the present invention, it can be determined whether the fluid may include only a gas phase or only a liquid phase, or both. If the fluid includes only a gas phase or only a liquid phase, subsequent metering tasks are performed using conventional, single-phase integrated metering techniques well known to those skilled in the art.

(6) In one embodiment of an apparatus form of the invention, the body of the apparatus is substantially Y-shaped. By having a substantially Y-shaped cross section, the multiphase fluid flows smoothly as it is directed vertically into the entrance, through the flow passage, and is discharged horizontally from the flow passage through the exit. The Y-shape of the body and the combination of the conical shape of the movable flow diverter and tapered shape of the stationary housing allow for a gradual transition of gas-liquid from the inlet upwardly and vertically to exit horizontally, thus facilitating smooth flow of the multiphase fluid, thereby avoiding phase separation and re-circulation conditions by preventing excessive velocity changes, and particularly fluid pressure changes.

Thus, broadly stated, in one aspect of the invention, a method for determining a property of a flowing multiphase fluid is provided, comprising:

(a) directing the multiphase fluid through an apparatus comprising:
  a body comprising an entrance for directing the multiphase fluid, and an exit for discharging the multiphase fluid and defining a flow passage between the entrance and the exit for directing the flow of the multiphase fluid therethrough; and
  a flow diverter assembly comprising a stationary housing disposed downstream of the entrance; and a movable flow diverter movable towards, within, or away from the stationary housing; the stationary housing and the movable flow diverter together defining a metering flow area and guiding the flow of the multiphase fluid towards and out of the metering area;

(b) positioning the movable flow diverter at a home position;

(c) monitoring the multiphase fluid with at least one monitoring device in communication with the metering flow area to obtain a signal representing the property of the multiphase fluid;

(d) determining a value of the property of the multiphase fluid by comparing the signal with a set of sensor feature maps;

(e) adjusting the movable flow diverter by predetermined increments proximate to the home position to obtain a first pair of reference signals, and comparing the reference signals with the set of sensor feature maps to determine values of the property of the multiphase fluid;

(f) comparing the value obtained in step (d) with the values obtained in step (e); and (g) based on the comparison, continuously monitoring the multiphase fluid, or re-adjusting the position of the movable flow diverter within or away from the stationary housing to obtain a new home position and suitable metering conditions in the metering area.

In another aspect of the invention, a system for use in determining a property of a flowing multiphase fluid is provided, comprising:

(a) an apparatus comprising:
  (i) a body comprising an entrance for directing the multiphase fluid, and an exit for discharging the multiphase fluid and defining a flow passage between the entrance and the exit for directing flow of the multiphase fluid therethrough;
  (ii) a flow diverter assembly comprising a stationary housing disposed downstream of the entrance; and a movable flow diverter movable towards, within, or away from the stationary housing; the stationary housing and the movable flow diverter together defining a metering flow area and guiding the flow of the multiphase fluid towards and out of the metering area; the movable flow diverter being coupled to a displacement assembly for positioning the flow diverter towards, within, or away from the stationary housing;
  (iii) at least one monitoring device mounted in fluid communication at a measurement point for monitoring the property of the multiphase fluid flowing therethrough; and (b) a controller communicatively coupled to the at least one monitoring device for calculating the property of the multiphase fluid from at least two signals received from the at least one monitoring device.

In yet another aspect of the invention, an apparatus for use in determining a property of a flowing multiphase fluid is provided, comprising:

(i) a body comprising an entrance for directing the multiphase fluid, and an exit for discharging the multiphase fluid and defining a flow passage between the entrance and the exit for directing flow of the multiphase fluid therethrough;

(ii) a flow diverter assembly comprising a stationary housing disposed downstream of the entrance; and a movable flow diverter movable towards, within, or away from the stationary housing; the stationary housing and the movable flow diverter together defining a metering flow area and guiding the flow of the multiphase fluid towards and out of the metering area; the movable flow diverter being coupled to a displacement assembly for positioning the flow diverter towards, within, or away from the stationary housing;

(iii) at least one monitoring device mounted in fluid communication at a measurement point for monitoring the property of the multiphase fluid flowing therethrough; wherein the apparatus is capable of being communicatively coupled to a controller for calculating the property of the multiphase fluid from a signal received from the at least one monitoring device.

Additional aspects and advantages of the present invention will be apparent in view of the description, which follows. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the invention will now be described with reference to the accompanying drawings, in which:

FIG. 7 also presents in medallion the analytical equation obtained through regression of the same.

DETAILED DESCRIPTION OF PREFERRED EMBODIMENTS

The present invention relates to an apparatus, system, and method for use in determining a property of a flowing multiphase fluid. Preferably, however, the multiphase fluid includes a gas phase and at least one liquid phase. Most preferably, the multiphase fluid is a two phase fluid comprising a gas phase and a liquid phase. As used herein, "phase" refers to a substance having a chemical composition and physical state that is distinguishable from a co-currently flowing phase of a fluid having a different chemical composition or a different physical state. The invention is ideally suited for use with two phase multiphase fluids, but may also be used with single phase fluids and multiphase fluids having more than two phases.

The method may be used to determine any property of a flowing multiphase fluid, including density, volumetric flowrate, mass flowrate, and relative composition of the various phases of the multiphase fluid. Preferably, however, the method is used to determine the total transported volumetric flowrate and relative proportions of the phases present in the multiphase fluid. Most preferably, the method is used to determine the total transport flowrate and the relative proportions of gas and liquid phases that are present in a two phase multiphase fluid. In one embodiment, the method is used to determine the total transport flowrate expressed as total transport velocity ("$U_m$"), and the relative proportions of the gas versus total gas and liquid transported expressed as gas void fraction or void fraction ("GVF").

Figure 1:
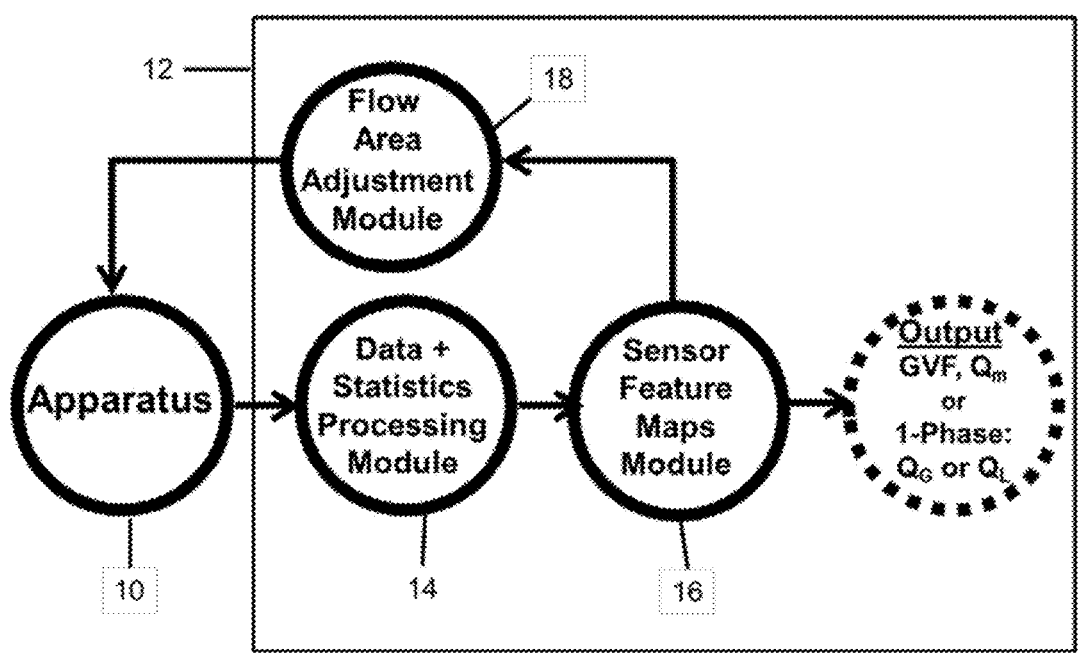
FIG. 1 is a schematic view of a preferred embodiment of a system form of the invention.
Figure 2:
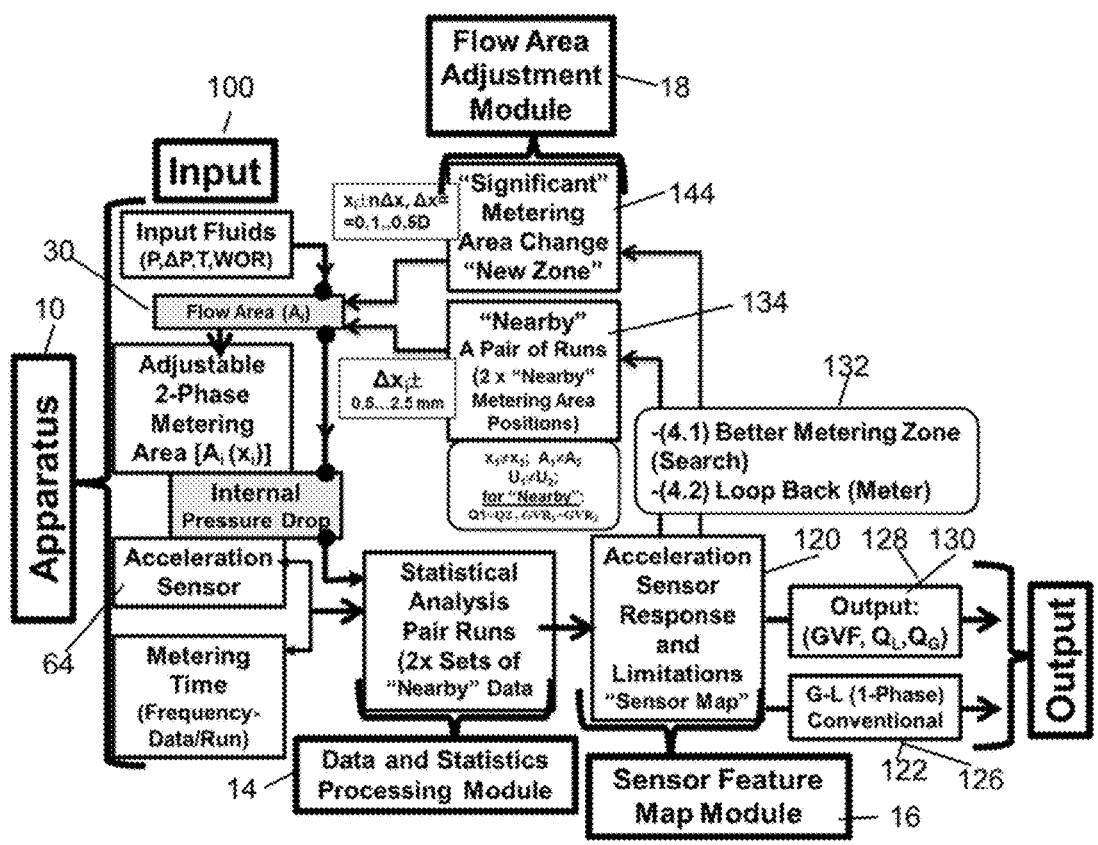
FIG. 2 is a block diagram of the system of FIG. 1, showing operations of each component of the system.
Figure 3:
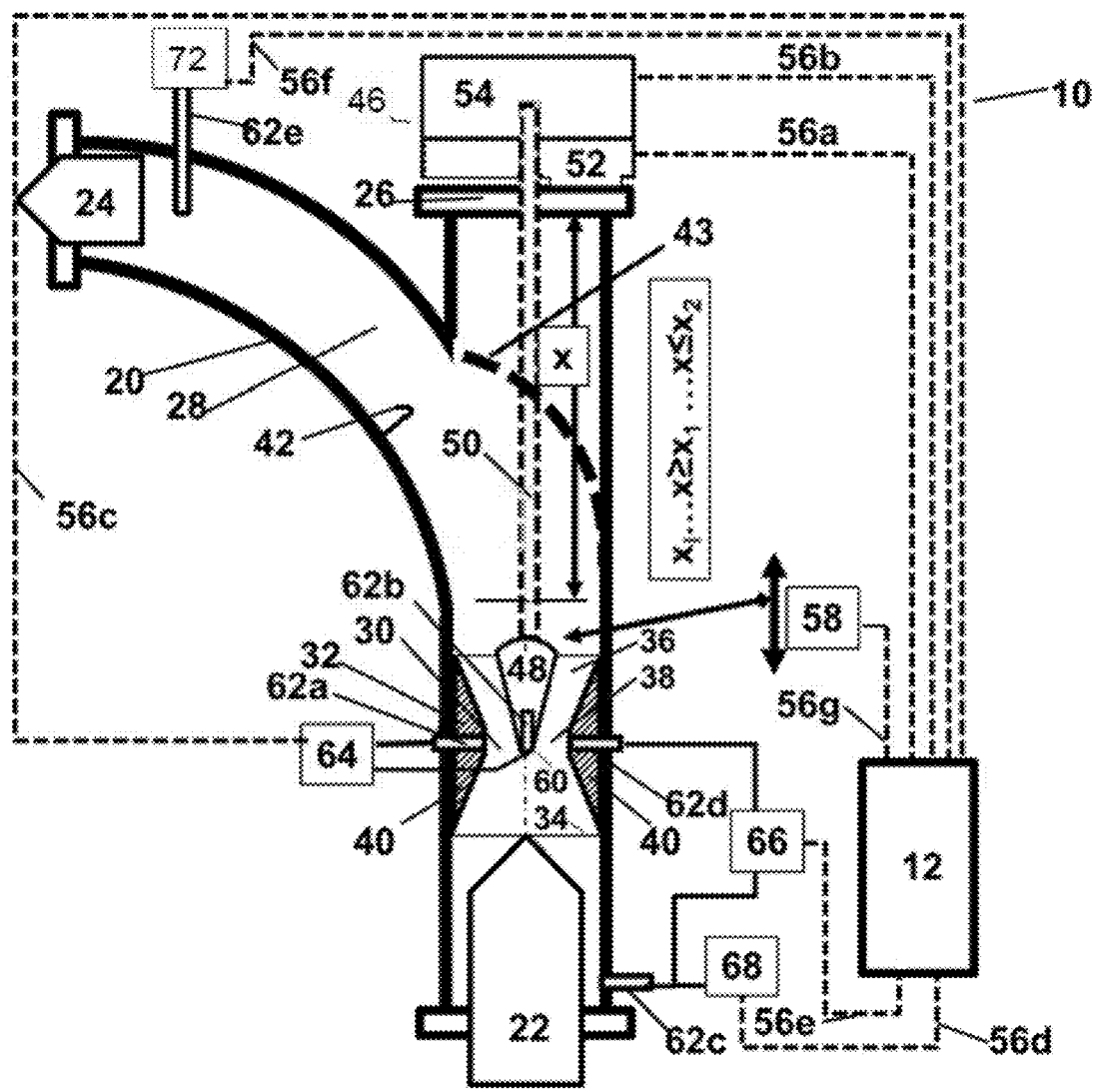
FIG. 3 is a schematic view of a preferred embodiment of an apparatus form of the invention.
Figure 4:
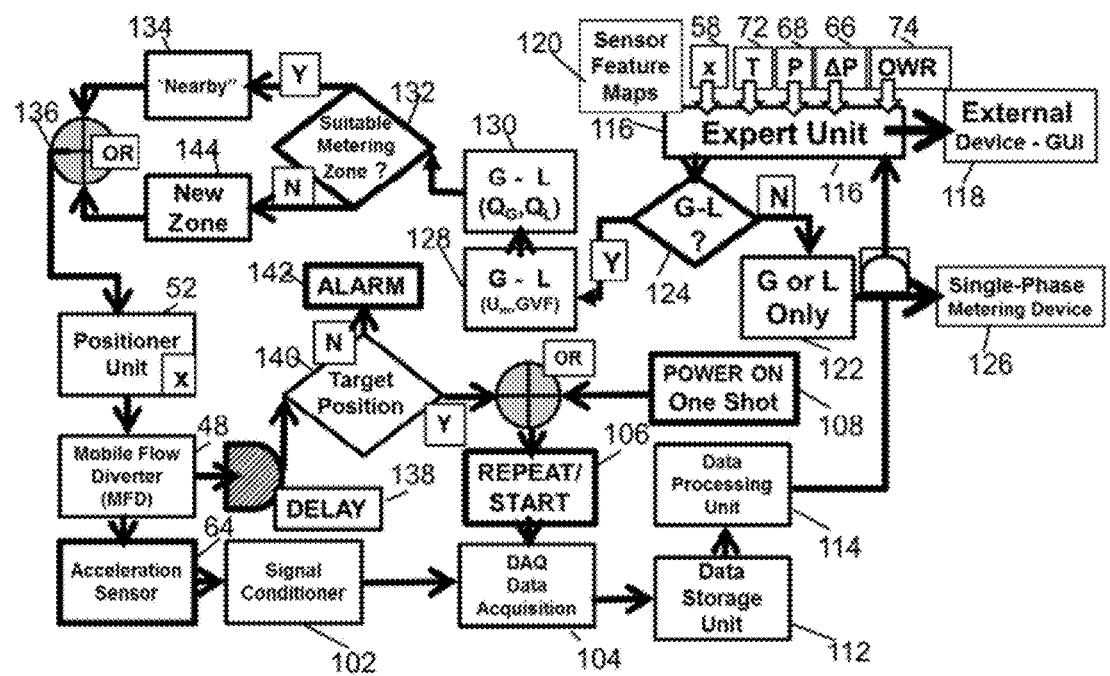
FIG. 4 is a block diagram showing a preferred embodiment of a method form of the invention.

Referring to FIGS. 1-4, the system form of the invention includes an apparatus (10) and a controller (12) generally comprising a data and statistics processing module (14), a sensor feature map module (16), and a flow area adjustment module (18), all of which intercommunicate to perform selected functions as detailed in FIGS. 2 and 4.

An exemplary apparatus (10) which can be used in the present invention is shown generally in FIG. 3 to include a body (20) which is hollow and defines an entrance (22), an exit (24), a flanged end (26), and a flow passage (28) extending and defining a fluid flow path through the body (20) connecting the entrance (22) and the exit (24).

The body (20) allows the multiphase fluid to flow smoothly from a transport line (not shown) into the entrance (22), through the flow passage (28), and out the exit (24) to return into the transport line (not shown). Preferably, the body (20) has an inner diameter which is the same or approximates the inner diameter of the transport line (not shown) from which the multiphase fluid enters into the apparatus (10) through the entrance (22), and into which the multiphase fluid is discharged from the apparatus (10) through the exit (24).

In one embodiment, the body (20) is substantially Y-shaped. By having a substantially Y-shaped cross section, the multiphase fluid flows smoothly as it is directed vertically into the entrance (22), through the flow passage (28), and is discharged horizontally from the flow passage (28) through the exit (24).

In one embodiment, the body (20) is substantially elbow-shaped. The elbow shape is rendered by inclusion of either a separating diaphragm (43) or a filling material (not shown) at the flanged end (26). The separating diaphragm (43) or the filling material (not shown) allow for low friction movement of a movable flow diverter (48). By having a substantially elbow-shaped cross section, the potential for accumulation of the light phase or gas in the "dead zone" at the flanged end (26) may be avoided.

A flow diverter assembly comprises a stationary flow conditioning housing (32) and a movable flow diverter (48). The stationary flow conditioning housing (32) and the movable flow diverter (48) operate in tandem and co-axially to modify a metering section (30) as the movable flow diverter (48) is moved towards, within, or away from the stationary housing (32). The stationary flow conditioning housing (32) and the movable flow diverter (48) together guide the flow of the multiphase fluid towards and out of the metering section (30). As will be further described, the configurations of the stationary flow conditioning housing (32) and the movable flow diverter (48) enable one or more of the following:

- establish a desired, predetermined flow metering section (30);
- handle a relatively broad range of gas-liquid ratios and transport velocities at the entrance (22) and adjustment of the flow metering section (30) to obtain accurate measurements with negligible modifications of inlet gas-liquid GVF at each metering position during the standard metering procedure which involves minor modifications of metering area executed through small displacements of the movable flow diverter around a specific home position;
- facilitate the flow area transition from circular at the apparatus entrance (22) to annular within the metering section (30) and circular at the exit of the metering section (30);
- eliminate flow oscillations occurring during some critical input flow conditions due to gas-liquid flow pattern transitional conditions known as "flow pattern transitional zones." Such flow oscillations may induce noise unrelated to gas-liquid transport velocity and concentration that may be picked up by the monitoring device; and
- minimize the non-recoverable pressure drop calculated for a pair of metering positions of the movable flow diverter (48). Consequently, the flowrate and gas-liquid distribution are relatively unchanged between two operations that represent the designated pair metering procedure.

The stationary flow conditioning housing (32) is disposed downstream of the entrance (22), and includes a converging inlet (34) and a diverging outlet (36) at the opposite ends thereof, and a metering section (30) between the converging inlet (34) and the diverging outlet (36). The housing (32) defines the metering section (30) at which properties of the flowing multiphase fluid are measured and within which the flow conditions may be adjusted, as will be further described. The housing (32) may be formed by one or more structures which are contoured to adapt to a broad range of inlet (22) transport velocities (Um) and gas-liquid ratios (GVF), and to eliminate the risk of inducing separation-detachment flowing conditions throughout the flow passage (28).

In one embodiment, the housing (32) is formed by a pair of double-tapered inserts (40) which are attached to the inner surface (42) of the body (20). Rapid velocities-pressure variations inside the flow diverter system which may lead to fluid detachment, gas exhoultion, and non-equilibrium related gas-liquid "noise" are avoided through the design of double-tapered inserts (40) and of the movable flow diverter (48) as well as through the metering controlling concept. The velocity may then slightly decrease as the multiphase fluid passes from the metering section (30) within which the flow is controlled by the inserts (40) and the movable flow diverter (48), into the outlet (36) and flow passage (28). As will be further described, the position of the movable flow diverter (48) in conjunction with the inserts (40) "conditions" the flow of the multiphase fluid for the desired or suitable metering conditions.

However, in the present invention, the velocity of the multiphase fluid at the metering section (30) is variable, and may be precisely adjusted to achieve the desired or suitable metering conditions. The movable flow diverter (48) is positioned towards, within, or away from the stationary flow conditioning housing (32), and is configured to be axially movable within the body (20), particularly within the double-tapered inserts (40), in order to adjust the transported velocity of the multiphase fluid entering the metering section (30). The transported fluid velocity may be altered by adjusting the position of the movable flow diverter (48) at relatively small distances such that the recoverable pressure drop of the apparatus and input flowrate and gas-liquid proportion (GVF) are not noticeably changed during a pair metering procedure, or in significantly larger distances to influence the inlet flowrate of the multiphase fluid. The movable flow diverter (48) is coupled to a displacement assembly (46) for calibrating and adjusting the position of the movable flow diverter (48) towards and away from the housing (32).

In one embodiment, the movable flow diverter (48) comprises a plug positioned on a rod (50) that is disposed centrally and extends through the flanged end (26) to connect to the displacement assembly (46). In one embodiment, the movable flow diverter (48) is substantially conically-shaped. The conical shape streamlines the upward incoming flow of gas and liquid, avoiding fluid detachment and related unwanted gas-liquid separation activities to take place upstream or downstream the metering section (30).

In one embodiment, the body (20) is substantially Y-shaped and the movable flow diverter (48) is substantially conical-shaped. Having a Y-shaped-body (20) and a conical-shaped flow diverter (48) conditions the incoming multiphase fluid into a higher suitable velocity, achieving a quasi-homogenous mixture of gas-liquid in the metering section (30) by facilitating smooth flow of the multiphase fluid, thereby avoiding fluid separation, re-circulation conditions, significant velocity changes, leading to downstream flow constrictions such as vena contracta, and an increase in any non-recovered pressure drop. As used herein, the term "homogenous" refers to a gas and liquid as well as to two liquids (e.g., gas and oil; air and water, or oil and water only) behaving almost as a single, well-mixed phase. The housing (32) enables a smooth velocity change and minimizes the total pressure loss of the multiphase fluid across the entrance (22) and exit (24) of the apparatus (10), while achieving a quasi-homogenous mixing at the metering section (30).

The displacement assembly (46) is positioned outside of the flanged end (26) of the body (20) and adjacent to the exit (24). The displacement assembly (46) includes a flow diverter positioner (52) and a motor (54), each of which is in communication with the controller (12) by respective communication lines (56a, 56b). In one embodiment, the flow diverter positioner (52) comprises an impulse-type stepwise displacement device. In one embodiment, the motor (54) comprises a linear stepper motor.

All possible transport velocity changes in the metering section (30) and subsequent flowrate of the multiphase fluid are mediated by the corresponding various positions of the movable flow diverter (48). The linear stepper motor (54) produces incremental or decremental linear movement, namely movement occurring in steps of precise distance (58). The position of the movable flow diverter (48) may be represented by distance "x" which varies between a minimum distance "$x_1$" to a maximum distance "$x_2$" (FIG. 3).

At any particular "$x_i$" position of the movable flow diverter (48), a maximum flow area and minimum multiphase fluid velocity is observed at a distance $x_i$ (depending on the particular design of the moveable flow diverter (48) and housing (32)). When the movable flow diverter (48) is retracted well away from the housing (32) at the divider (43), the metered area (30) is mainly identical with the minimum area determined by the particular design of the housing (32).

The positioner (52) continuously records the position of the movable flow diverter (48) in real-time, and generates a signal representative of the position of the movable flow diverter (48). The signal is transmitted through the communication line (56a) to the controller (12). The controller (12) is responsive to the positioner (52) and motor (54), and produces output signals to the motor (54) through communication line (56b) to impart one of the following actions: (i) no movement of the movable flow diverter (48); (ii) fine back-and-forth movement of the movable flow diverter (48) over a relatively small distance to evaluate a pair of local flow diverter positions (and implicitly of metered flow area and transport velocity U(m)); and (iii) changing the location of the movable flow diverter (48) over a substantially larger distance to conduct a "search" for a suitable metering flow area within the metering section (30), as will be further described. The motor (54) thus receives signals from the controller (12) to advance or retract the movable flow diverter (48) towards or away from the housing (32).

The controller (12) may also receive and be responsive to signals received from various monitoring devices (64, 66, 68, 72), all of which are communicatively coupled with the controller (12) by respective communication lines (56c, 56d, 56e, 56f). As used herein, the term "communicatively coupled" is intended to mean either a direct or an indirect communication connection. Such connection may be a wired or wireless connection which is well known to those skilled in the art and will therefore not be discussed in detail. Each monitoring device (64, 66, 68, 72) detects a parameter of interest and generates signals representative of the parameter in continuous real time. The signals are then transmitted to the controller (12) for processing and analysis, and in the appropriate circumstances, for generating output signals to control the positioner (52) and motor (54).

The monitoring devices (64, 66, 68, 72) are mounted in fluid communication (i.e., in contact with the fluid) at measurement points for monitoring properties of the multiphase fluid. The measurement points may be anywhere along the flow passage (28). Preferably, the measurement points may include the entrance (22), the housing (32), and the exit (24), and the tip (60) of the movable flow diverter (48). Preferably, the monitoring devices (64, 66, 68, 72) do not impede the flow of the multiphase fluid. The monitoring devices (64, 66, 68, 72) are coupled to corresponding ports (62a, 62b, 62c, 62d, 62e) provided at the measurement points to enable contact with the multiphase fluid. In one embodiment, the ports (62a, 62e) are disposed circularly within the metering section (30). In one embodiment, a port (62b) is positioned at the tip (60) of the movable flow diverter (48).

The monitoring devices (64, 66, 68, 72) may comprise any types of transducers capable of generating signals representing properties of the flowing multiphase fluid. Suitable transducers include, but are not limited to, accelerometers, pressure transducers, differential pressure transducers, and temperature transducers. Preferably, the generated signals are electrical signals.

Pressure measurement points may be used for continuously monitoring pressure changes occurring as the multiphase fluid flows through the apparatus (10). In one embodiment, a measuring port (62a) is positioned at the metering section (30) as dictated by the relative positions of the inserts (40). In one embodiment, a measuring port (62b) is positioned at the tip (60) of the movable flow diverter (48) positioned in the vicinity of the metering section (30). The continuous pressure variation may be made with a transducer (64) which is in contact with the multiphase fluid through the measuring ports (62a, 62b), and provides a voltage reading of the multiphase fluid at a particular location dependent on the configuration of the flow diverter (48) and housing (32), or at the tip (60) of the flow diverter (48).

The passage of the multiphase fluid through the metering section (30) produces a relatively small acceleration-related pressure fluctuation defined as:

$$\Delta P_{acc} = \Delta \rho_m \cdot U_m \cdot \Delta(U_m) \qquad \text{Eq. (1)}$$

wherein the symbol $\Delta$ indicates time or local position change or fluctuation (of transport velocity and/or density), $P_{acc}$ is the acceleration component of pressure, $\rho_m$ is the composite gas-liquid local density, and $U_m$ is the local transport velocity. "Local" indicates a variable value in the metering area (30), where, usually, the acceleration sensor is placed.

However, as described in U.S. Pat. No. 6,155,102 to Toma et al., acceleration-related pressure drop fluctuation impulses may be useful in determining a property of a multiphase fluid.

In one embodiment, the transducer (64) is a high-frequency acceleration sensor capable of detecting real-time pressure oscillations mainly caused by density variations of the multiphase liquid flowing through the metering section (30). The pressure oscillations are transmitted in the form of signals through the communication line (56c) to the controller (12). The controller (12) processes the signals and converts them into voltage oscillations representative of the passage through the metering area of the two distinct phases of the multiphase fluid.

A pair of pressure measurement points may be provided at the entrance (22) and the metering section (30) to define a pressure differential which is detected by a differential pressure transducer (66) connected between metering ports 62c and 62d. A pressure measuring port (62c) is provided to measure the pressure at the entrance (22), and is connected to a pressure transducer (68) to provide a pressure reading. The pressure readings are transmitted in the form of signals through respective communication lines (56d, 56e) to the controller (12) which processes the signals. In one embodiment, a pair of pressure measurement points may be provided at the entrance (22) and the exit (24) to define a pressure differential. The pressure changes approximate the respective flow rates of the phases of the multiphase fluid. By determining the individual flow rates of the gas and of the liquid phases of the multiphase fluid, the composition of the multiphase liquid (i.e., the ratio of the gas to the total gas and liquid phases) can be accurately determined.

In one embodiment, the exit (24) may be provided with a temperature port (62e). A temperature measurement may be made with a temperature transducer (72) which is in contact with the multiphase fluid through a thermowell mounted at port (62e), and provides a continuous temperature reading of the multiphase fluid before it is discharged through the exit (24). The temperature reading is transmitted in the form of a signal through the communication line (56f) to the controller (12) which processes the signal.

Signals representing data obtained by other means such as, for example, water content expressed as the water to oil ratio as measured by a suitable "add-on" instrument (74) (FIG. 4) integrated with the apparatus (10), may also be transmitted to the controller (12) for processing and analysis.

The controller (12) may include any instrumentality or aggregate of instrumentalities operable to compute, classify, process, transmit, receive, retrieve, originate, switch, store, display, detect, record, handle, or utilize any form of information or data. For example, the controller (12) may be any suitable computer-system configuration, including handheld devices, multiprocessor systems, microprocessor-based or programmable-consumer electronics, minicomputers, mainframe computers, and the like. Any number of computer-systems and computer networks are acceptable for use with the present invention, provided they are installed in the hazardous area classification for which they are certified. The invention may be practiced in distributed-computing environments where tasks are performed by remote-processing devices that are linked through a communications network. In a distributed-computing environment, program modules may be located in both local and remote computer-storage media including memory storage devices. The present invention may be implemented in connection with various hardware, software, or a combination thereof, in a computer system or other processing system. The controller (12) or computing unit may include a memory, computer-readable media comprising computer storage media, application programs, a user interface, a video interface, and a processing unit. Although many other components of the controller (12) are not described, those skilled in the art will appreciate that such components and their interconnection are well known. The memory primarily stores the application programs or program modules containing computer-executable instructions which are executed by the controller (12) for implementing the described functions. The memory includes the data and statistics processing module (14), the sensor feature map module (16), and the flow area adjustment module (18). The controller (12) generates output signals to the positioner (52) and motor (54) based on feedback from each of the data and statistics processing module (14), the sensor feature map module (16), and the flow area adjustment module (18).

Referring to FIGS. 2-4, exemplary methodologies of the present invention will now be described. At block 100, the multiphase fluid is directed from the transport line (not shown) into the entrance (22). The transducer (64) detects continuous real-time pressure oscillations caused by density-transport velocity variations of the multiphase liquid flowing through the metering section (30), and transmits a corresponding signal to the controller (12) for processing. Preferably, the signal is electrical. A signal conditioner (102) eliminates or filters any external noise and interference from the signal. The processed signal is then transmitted to a data acquisition unit (104) which is controlled by a repeat/start module (106). When the controller (12) powers up (108), it generates a command through the OR block (110) to the repeat/start module (106) which activates the data acquisition unit (104). The data acquisition unit (104) retains the processed signal for a predetermined amount of time to collect a sufficient number of data points required to perform time-stable statistical analysis. As used herein, the term "time-stable" refers to the repeatability of characteristics extracted through conventional statistical data processing tools such as, for example, the Probability Distribution Function (PDF). The data storage unit (112) subsequently receives a complete set of data representing time-voltage signals collected over a specific period. Preferably, the time-voltage signals are stored as 24 bit resolution signals.

The data processing unit (114) performs statistical analysis including, but not limited to, creation of sets of data points from the signals, development of probability density functions (PDF) from the sets of data points, and derivation of values for specific parameters from the probability density functions. In one embodiment, the time-voltage signals are divided into bands or holding bins (e.g., 1000 bins). Each bin represents a different interval value for the amplitude of a voltage signal group, and contains a number of voltage signals collected for the voltage interval. These data are used to calculate the probability density function (PDF) which is defined as:

$$f(x)=dF(x)/dx \qquad \text{Eq. (2)}$$

where:

$$F(x)=\Sigma x_i/n \text{ for } i=0 \text{ to } x \text{ and } n=\Sigma h_j \text{ for } j=0 \text{ to } 999 \text{ (i.e. 1000 bins)} \qquad \text{Eq. (3)}$$

(j=number of bins) hj—elements of histogram representing the number of times the acquired signal has a voltage value between Vj–V(j+0.8)/number of bins Statistical parameters that may be derived directly from the signals or from PDFs developed by processing the signals include, but are not limited to, minimum signal value, maximum signal value, mean signal value, median signal value, variance, standard deviation of the PDF, skewness of the PDF, kurtosis of the PDF, and momentums of the PDF. Parameters that may be derived from other processing of the signals include those related to the frequency of the signals, such as linear prediction model parameters and cepstrum function parameters, as well as those which may be obtained from other mathematical processing of the signals.

The preferred statistical parameters for determining the transport parameters are the maximum probability density function value ($PDF_{max}$) and the corresponding difference in the value of the $PDF_{max}$ between two predetermined transport velocities obtained from a pair of local reference movable flow diverter positions ("nearby" pair positions). The PDF histogram has a specific kurtosis or histogram shape which is related to two-phase flow through the metering section (30). The $PDF_{max}$ values are compared with the total processed number of impulses. Accumulation of all impulses in only a few bins (e.g., 1-5 bins) centered by zero voltage value indicates that a single density fluid is flowing through the metering flow area (30). A gas void fraction ratio (GVF) about equal to 0 indicates only near liquid, while a GVF about equal to 1 indicates only near gas. When discrete phase elements are present (e.g., bubbles transported in a continuous liquid phase or droplets transported in a continuous gas or vapor phase), impulses of various voltages are obtained of a number strictly related to the number and size of all gas-liquid frontiers passing by the metering section (30). Extreme values of $PDF_{max}$ may be indicative of high transport velocities which lead to high turbulence and high-shear to yield a very fine structure of dispersed phase, behaving as a single phase as the extremely small dispersed structures may not be able to energize the acceleration sensor at all. All impulses are concentrated in a small number of bands (bins), and the PDF histogram shifts to a central lower voltage zone, a condition also observed for gas or liquid flow only.

An expert unit (116) converts the movable flow diverter position "x" (58) and inputs from the PDF resulting from acceleration sensor processed impulses, from the pressure transducer (68), the differential pressure transducer (66), the temperature transducer (72), and any other instrument (74) integrated with the apparatus (10) into engineering units, and evaluates the information from the data processing unit (114). The expert unit (116) is communicatively coupled to external devices such as, for example, a graphical user interface (118), to output and display observations and results to plant operators continuously and in real time. Such observations and results may include, but are not limited to, total transport velocity ($U_m$) and average thereof, the relative proportions of the gas and liquid phases (gas void fraction or GVF), daily accumulated volumes of liquid and gas for a full month, monthly accumulated volumes of liquid and gas, and the like (expressed for a certain gas and liquid analytical composition and at the meter pressure and temperature P,T, always reducible to the standard condition usually indicated as P=101.325 kPa and T=15° C.).

Figure 7:
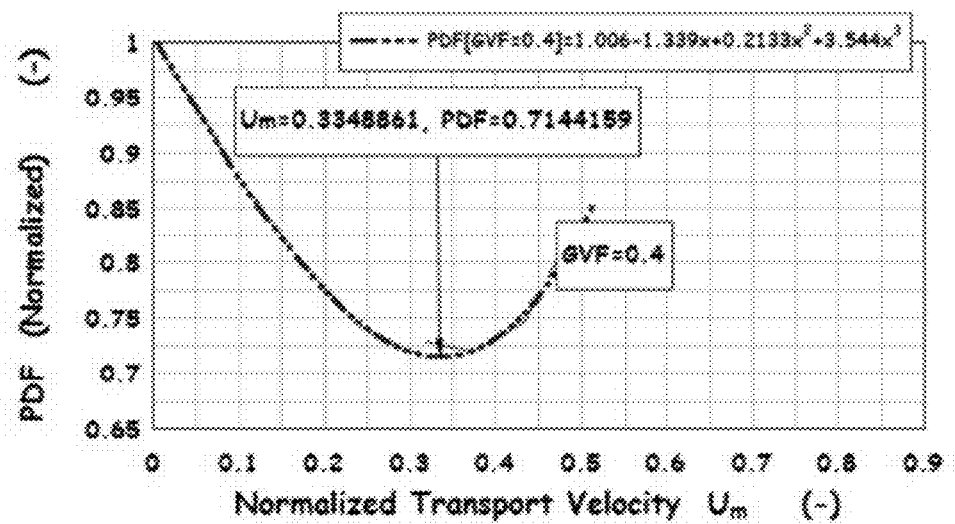
FIG. 7 is an example of a graph extracted from the sensor feature maps and prepared for use in the invention, in which PDF signal modifications are shown as being related to the dimensionless metered velocity Um (the specific sensor feature map being extracted as PDF=F(Um) for GVF=0.4).
Figure 8A:
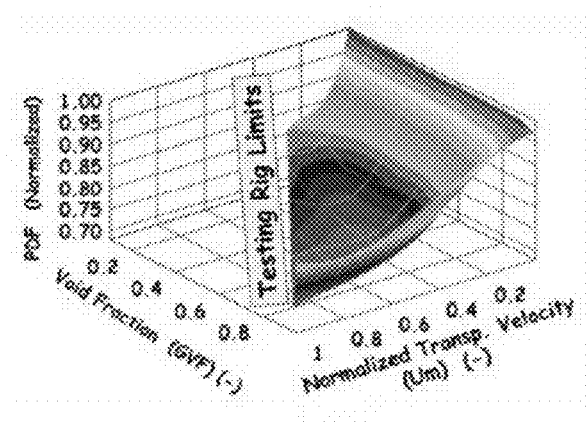
FIGS. 8A-B are 3-D examples of an acceleration sensor feature map and the respective PDF contour map (B)—a graph prepared for use in the invention using dimensionless transport velocity (Um) as well as PDF and GVF. The maps use a great number of sensor-response experimental data.
Figure 8B:
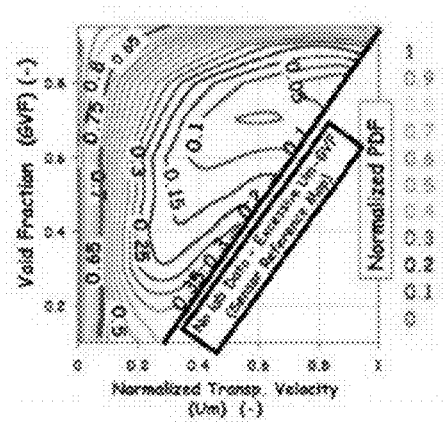

The values for the specific parameters are validated by comparison with a set of sensor feature maps (120). The set of sensor feature maps (120) preferably comprises at least one map representing each signal as a function of the property of the flowing multiphase fluid which is to be determined. In one embodiment, the method comprises the step of comparing each signal directly with the set of sensor feature maps (120) to determine the property of the flowing multiphase fluid. In one embodiment, the method comprises the step of deriving a value for a parameter from each signal, and comparing the value of the parameter with the set of sensor feature maps (120) to determine the property of the flowing multiphase fluid. Where the method includes the step of deriving parameters from the signals, the set of sensor feature maps (120) preferably comprises at least one map for each parameter as a function of the property of the flowing multiphase fluid which is to be determined. The set of sensor feature maps (120) may also comprise a set of graphs in which the property is expressed either as a function of the signal or of a parameter derived from the signal (FIGS. 7, 8A-B).

Based upon a comparison with the set of sensor feature maps (120) which preferably includes the PDF and a normalized gas-liquid flow characteristic such as, for example, normalized transport velocity $U_m$, wherein if the characteristics are expressed analytically such as PDF=F($U_m$)$_{@GVFi}$, a corresponding set of derivatives is obtainable through conventional mathematical methods such as, for example:

$$[d(\text{PDF})/d(Um)]@\text{GVF}i = F(Um,\text{GVF}) \qquad \text{Eq. (4)}$$

The expert unit (116) decides whether the fluid may include only a gas phase or only a liquid phase (122), or both (124). If the fluid includes only a gas phase or only a liquid phase (122), the expert unit (116) calculates the single phase flowrate using known equations of state (i.e., PVT methods known to those skilled in the art), and transfers subsequent metering tasks including the pressure drop (66) (FIG. 3) to a conventional, single-phase integrated metering algorithm (126). In the alternative, if the fluid includes both gas and liquid phases (124), the expert unit (116) proceeds to determine transport velocity ($U_m$), and gas concentration expressed as gas void fraction [GVF (–)] in m³/m³ (128) using the gas and liquid flowrates ($Q_G$, $Q_L$ in m³/h) (130).

The transport velocity ($U_m$) at a certain flow section indicated as $A_{flow}$ is defined as:

$$U_m = (Q_G + Q_L)/A_{flow} \qquad \text{Eq. (5)}$$

wherein $A_{flow}$ is the metering flow area for a certain apparatus design and for a known position of the movable flow diverter (MFD) (x).

The gas void fraction is defined (for the homogenized gas-liquid pre-conditioned in the flow area only) as:

$$\text{GVF} = Q_G/(Q_G + Q_L) \qquad \text{Eq. (6)}$$

Once GVF and Um are determined, the expert unit (116) can calculate the gas and liquid flowrates as follows:

$$Q_G = \text{GVF} \cdot Um \ast A_{flow} \qquad \text{Eq. (7a)}$$

$$Q_L = (1-\text{GVF}) \cdot Um \cdot A_{flow} \qquad \text{Eq. (7b)}$$

where Um has the velocity units (m/s) as converted for the dimensionless value customarily used in the sensor feature maps or reference operation characteristics (ROC).

In one embodiment, the transport velocity and gas void fraction are stored in the database using cubic function interpolation or direct data table search, and retrieved using a search-match process as further described. Based on results from these calculations, the expert unit (116) queries whether or not the measurement of the fluid lies in a linear, accurate, and stabilized metering condition (132). This is confirmed by obtaining a set of measurements for a pair of "nearby" or local positions (134) for same movable flow diverter position comparative assessment. The pair positions (x1, x2) are identified to be proximate the initial or "home" measuring position (xi) such that the home measuring position (xi) becomes median between the pair positions (x1, x2). In one embodiment, the movable flow diverter positions (x1, x2) are proximate the home measuring position ($x_{1-2}$) by relatively small displacement distances of the movable flow diverter (48). In one embodiment, the median position xi1-2 is identical to x1.

A command is initiated through the OR block (136) to output a signal to the positioner (52) to relocate the movable flow diverter (48) to the target position (x1, x2). A feedback signal (58, 56g; FIG. 3) from the flow area adjustment module (18) is monitored and assessed to determine whether the movable flow diverter (48) has reached the target position (x1, x2) within a predetermined time delay (138). At block (140) it is determined whether or not the movable flow diverter (48) is in the target position (x1, x2) to acquire a set of measurements. If the movable flow diverter (48) has not reached its target position (x1, x2) within the allotted time, an alarm (142) triggers to alert plant operators. In the alternative, if the movable flow diverter (48) has reached the target position, the repeat/start (106), enabled through OR (110), instructs the data acquisition unit (104) to start recording signals from the monitoring devices (58, 66, 68, 72, 74).

Once set to the first local position (x1), the movable flow diverter (48) remains stationary for a sufficient amount of time to allow a first set of data to be collected from the monitoring devices (58, 66, 68, 72, 74). After the first set of data has been collected, the movable flow diverter (48) is set to the second local position (x2) at which it remains stationary for a sufficient amount of time to allow a second set of data to be collected from the monitoring devices (58, 66, 68, 72, 74). Successively repositioning the movable flow diverter (48) back-and-forth between the first and second local positions (x1, x2) allows collection of additional sets of data to recalculate and refresh the liquid and gas flowrates values periodically.

The total amount of time for metering (i.e., repositioning the movable flow diverter (48) to each of the first and second local positions (x1, x2) and for collecting a set of data at each of the first and second local positions (x1, x2)) may be relatively brief. In one embodiment, the total amount of time for metering ranges from about 10 seconds to a maximum of about 60 seconds. This speed of metering may be attributed to small changes in movable flow diverter position using the local positions (x1, x2) and the short data collection time. Regardless of such brevity, metering in this manner generates measurable parameters and sufficient data. Although when the metering section (30) (hence, the gas-liquid transport velocity) is only slightly altered, the composition of the multiphase fluid at the entrance (22) and the inlet gas-liquid total flowrate are negligibly changed, indicating the insignificant effect the movable flow diverter (48) repositioning to a "nearby" metering position x1-x2 has on the apparatus recovery pressure (FIG. 6, Example 2).

The collected data from the monitoring devices (58, 66, 68, 72, 74) are transmitted, processed, analyzed, and validated in the same manner as described above. Once a set of parameters (i.e., transport velocity $U_m$ found as median between two "nearby" metering positions x1-x2 or at one extreme as x1 or x2) for the local pair positions (x1, x2) has been calculated and compared to the parameters obtained from the home measuring position (xi), the expert unit (116) decides whether the measurements are acceptable or unacceptable, and initiates appropriate action. The sensor feature maps (120) indicate the expected transducer response to similar gas-liquid transport velocity, GVF, and gas-liquid density difference, provided that the multiphase fluid is properly conditioned for the metering section (30) within the apparatus (10) and locally, inside mainly the metering section (30), and practically behaves as a homogenous gas-liquid mixture. If at block 132, it is determined that the measurements are acceptable, metering is maintained in the suitable metering section (30) (i.e., home measuring position (xi) defining the pair x1 and x2) as long as the external system flow conditions (as input) do not noticeably change. Measurements are considered acceptable when it is determined they take place in a linear, accurate and stabilized metering condition, where "linear" indicates a proportionality between pairs of movable flow diverter positions xi and flow area and subsequently, gas-liquid transport velocities $U_{m1}$, $U_{m2}$.

In the alternative, if at block 132, it is determined that the measurements are unacceptable, a "search" is triggered for better metering flow conditions (144) by seeking a new movable flow diverter position (i) and the condition is assessed for a second pair of local positions (x3, x4). Determination of acceptable measurements is again confirmed by first assessing the "quality" of the metered parameter and then using the set of sensor feature maps (120) for gaining further information. As shown in the sensor feature map of FIGS. 8A-B for example, the density of the PDF contour lines significantly increases at both very low and extremely high GVF, at which the PDF approaches a maximum value and decreases towards a central zone plateau. High density PDF contour lines may indicate extreme gas, low liquid conditions (high GVF); extreme liquid, low gas conditions (very low GVF); and/or extreme high gas and liquid flow rates leading to a fine, homogeneous gas-liquid flow where the dispersed phase is too fine and transport velocity is too high for transducer and system sensitivity (i.e., for measuring time-acceleration pressure-voltage). Unacceptable measurements thus include, but are not limited to, those relating to an excessively high GVF indicating only a gas phase (e.g., GVF>0.95); an excessively low GVF indicating only a liquid phase (e.g., GVF<0.05); a "noisy" PDF indicating variable input flow-pressure conditions caused by either significant flowrate and/or composition variation or major input flow change or extremely low transport velocities or stagnant conditions; and the like. Unacceptable measurements indicate a need to re-adjust and restore suitable metering conditions by "moving out" from high-density zones as indicated by the sensor feature maps.

To conduct a "search" for better metering flow conditions, the metering section (30) is significantly changed by displacing the movable flow diverter (48) to a "new" home measuring position (new xi). In one embodiment, the movable flow diverter (48) is sizably displaced three to ten times the distance customarily considered as x1-x2 (nearby distance) (depending on the specific configuration of the movable flow diverter (48) and housing (32)). In the manner described above, a set of measurements for new pairs of "nearby" or third and fourth local home positions xi(i=3,4) is initiated and obtained. The third and fourth local positions (x3, x4) are identified to be proximate the "new" home measuring position (new xi) such that the new home measuring position (new xi) becomes median between the third and fourth local positions (x3, x4).

Once set to the third local position (i=3), the movable flow diverter (48) remains stationary for a sufficient amount of time to allow a set of data to be collected from the monitoring devices (58, 66, 68, 72, 74). After the set of data has been collected, the movable flow diverter (48) is set to the fourth local position (i=4) at which it remains stationary for a sufficient amount of time to allow a second set of data to be collected from the monitoring devices (58, 66, 68, 72, 74). Successively repositioning the movable flow diverter (48) back-and-forth between the third and fourth local positions (i=3, 4) allows collection of additional sets of data. The data are transmitted, processed, analyzed, and validated in the same manner as described above, including determination of acceptable or unacceptable measurements at block (132) and initiation of subsequent action at block (134) or block (144).

Through repeated measurements, the expert unit (116) eventually locates the suitable metering section (30) by changing the position of the movable flow diverter (48) and implicitly the flow metering area at which measurements are taken, and continuously collects measurements at the suitable metering section (30), provided that the external flow conditions do not significantly change. In this manner, the expert unit (116) becomes trained over time and learns specific critical flow conditions encountered such that in the event of a change, remedial action can be taken to maintain a linear, accurate, and stabilized metering condition. In the event that the flow conditions change and the measurements may indicate an unstable metering condition, the metering section (30) is subsequently altered by displacing the movable flow diverter (48) until the measurements being collected indicate restoration to a linear, accurate, and stabilized metering condition.

The foregoing apparatus, system, and method described herein are particularly useful in continuous, real-time monitoring of a single well or multiple wells simultaneously, with each well equipped with its own apparatus. The apparatus is able to display the flowrate and gas-liquid ratios (e.g., oil, water, gas) for each well in the field prior to reaching or bypassing a tank separator. The invention may enable production optimization for an entire field to increase overall production and to implement effective reserve savings procedures.

Although various embodiments and methodologies have been shown and described, the invention is not limited to such embodiments and methodologies and will be understood to include all modifications and variations as would be apparent to one skilled in the art. It should be understood that the invention is not intended to be limited to the particular forms disclosed. Rather, the intention is to cover all modifications, equivalents and alternatives falling within the scope of the invention as defined by the appended claims.

Embodiments of the present invention are described in the following Examples, which are set forth to aid in the understanding of the invention, and should not be construed to limit in any way the scope of the invention as defined in the claims which follow thereafter.

Two groups of numerical examples and calculations are presented:

In Examples 1 and 2, the pressure drop across the flow diverter package is evaluated using a 2" apparatus design and given flowrate and gas-liquid ratio.

Calculations performed for estimating the non-recovered pressure drop for a certain flow diverter position (x) and for a range of movable flow diverter positions, are essential for assessing the potential impact of the movable flow diverter and housing configuration to system pressure-flowrate characteristics. A significant differential pressure during a small movable flow diverter displacement may negatively impact on the "constant flowrates assumption" for the apparatus operation design.

Figure 5:
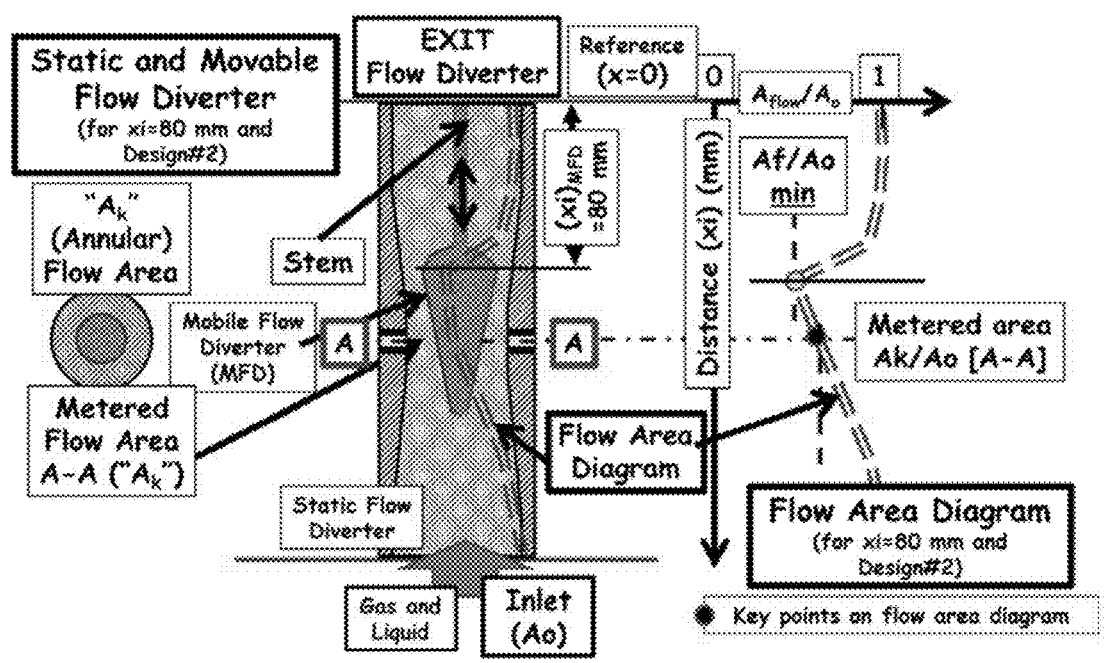
FIG. 5 is a schematic view of one embodiment of a flow diverter assembly comprising a stationary housing and a movable flow diverter defining the metering section (left), and a flow area diagram for a selected position (xi=80 mm) of the movable flow diverter and for calculating pressure drop (right).
Figure 6A:
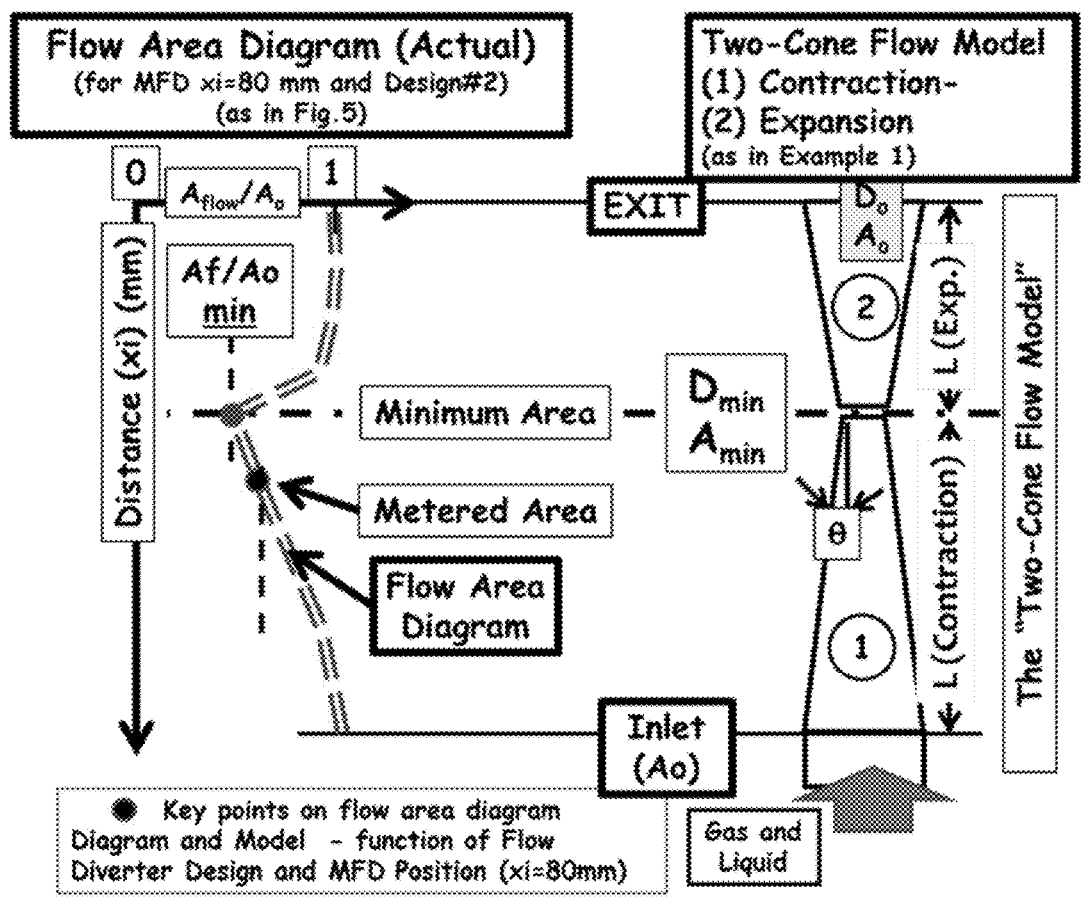
FIG. 6A is an example of a simplified double-cone flow model (right) obtained from an actual flow diagram for a flow diverter assembly and a selected position (xi) of the movable flow diverter (left), suggesting a minimum value of flow area at a level specific to the position of the movable flow diverter and a contraction-expansion of flow area as simplified by the model. The model may be used for calculating the non-recoverable pressure drop as exemplified in FIG. 6B and explained in Example 1.

The "homogeneous two-phase flow" assumption was used to calculate gas-liquid inlet properties. A double cone flow model (Crane model) has been used to simulate and simplify the complex modifications of flow area across the movable flow diverter and housing (also indicated as "stationary flow diverter" (FIGS. 5, 6A). The non-recovery pressure drop results calculated for a range (as 80 to 110 mm for the used design) of movable flow diverter positions (xi) and implicitly the position and value of minimum flow area at the conjunctions of the two-cone flow model (FIGS. 6A, 6B), using the Crane model (initially validated for one-phase flow only) are further compared with the results using the "Owen-Wade" model (validated under two-phase flow conditions).

Calculated non-recovered differential pressure drop (for data used in the example; Tables 1-3) and for movable flow diverter displacements ranging from 50-110 mm (FIG. 6B, right) and gas-liquid flowrate data (as in the medallion FIG. 6B, right) is in the range of 0.01-0.04 psi (0.07-0.28 kPa). The relatively low range of non-recovered pressure confirms that the effect of pressure change during a pair metering operation (small displacement of MFD) is very small and could be ignored; therefore, the constant fluid inlet condition during a pair metering procedure is considered to be practically valid, and is further supported by assessing the potential errors due to pressure-flowrate system alterations (Example 2).

In Example 3, information obtained from the sensor feature maps database and the nearby PDF pair measurement are combined with the modification of the metering section to evaluate the transport velocity (Um) and the gas void fraction (GVF). The pair flow diverter positions are simulated using actual apparatus design data. The "solution searching" operation procedure is introduced by combining key information extracted from the sensor reference maps and area flow changes during movable flow diverter displacement for acquiring a pair of metered PDF values in order to determine the appropriate Um and GVF values.

Example 1

The movable flow diverter and housing are configured to prepare the incoming (vertical) gas and liquid inflow to enter the metering section and properly guide the metered mixed fluids to re-enter the system pipe flow. Small variations of metered transport velocity and related metering section are induced through precisely controlled movable flow diverter displacement (x). Small displacement of the movable flow diverter and related modifications of transport velocity due to precise, known modification of the metered flow area (Ak) induce measurable differences of PDF causing neither noticeable change of the incoming gas and liquid flowrate nor modifications of the gas-liquid ratio (as GVF). The introduction of only minor system pressure-flowrate variations and minor changes of gas-liquid equilibrium without impacting the metering accuracy makes this possible.

Referring to FIG. 6A (and using FIG. 5 as base—both using the mobile flow diverter position xi=80 mm as an example) as the actual apparatus and the model adopted for recovery pressure drop, the specific design allows for a correlation indicating the length of the "compression" zone (as "1" in FIG. 6A, right) and the "expansion" zone (as "2" in FIG. 6A, right) as a function of the movable flow diverter position "xi" (see FIG. 5 as xi=80 mm):

$$Lc(\text{compression}) = 200 - L(\text{expansion}) \qquad \text{Eq. (8)}$$

$$Le(\text{expansion}) = xi + 14 \qquad \text{Eq. (9)}$$

Additional information for the calculation included the following:

1. $(A_{min}/A_o) = 0.4$ (for $x_{iflow\ diverter} = 80$ mm only)—Computer-generated for the particular design for $50 < xi < 80$ mm as calculation prerequisite using the detailed design features.
2. $D_{min}/D_o = (A_{min}/A_o)^{0.5} = 0.63$
3. $D_o = 49.5$ mm (1.95 inches)—design 2" apparatus/loop
4. $Lc \approx x$(movable flow diverter)$+14$ mm$-$(Lc$=80+14=94$ mm)
5. $Le = 200$ mm$-Lc$ (mm)$-$(Le$=200-94=106$ mm)

Equations 10-12 are used to calculate the non-recovered pressure drop in a double-cone flow model as $\Delta P$ expressed in Pa (eq. 11). The pressure drop in an area change, short flow element, is customarily calculated knowing the inlet gas-liquid densities (a homogeneous gas-liquid density ($\rho_{mo}$, kg/m$^3$) is calculated as a function of the gas and the liquid densities and the GVF), and the square of gas-liquid inlet transport velocity ($U_{mo}$, m/s). For specific units in eqs. 10 and 12, the acceleration due to gravity (g$\equiv$9.81 m/s$^2$) is used:

$$h(m) = K_{1,2} \frac{U_{mo}^2}{2g} \qquad (10)$$

$$\Delta P(\text{Pa}) = K_{1,2} \cdot \rho_{mo} \frac{U_{mo}^2}{2} \qquad (11)$$

$$\Delta P(\text{Pa}) = \rho_{mo} \cdot g \cdot h(m) \qquad (12)$$

Equations 10-12 introduce two empirical (experimental) constants $K_{1,2}$ depending on the specific design as further introduced through eqs. 13-16 and calculated for particular flow diverter positions (e.g., x=30, 50 and 80 mm; Table 1).

For cone angle ($\theta < 45°$ as velocity profile in the apparatus; FIG. 6A, right) empirical constants $K_{1,2}$ are expressed as:

$$K_{(contraction)} = \frac{0.8 \cdot (1 - \beta^2)}{\beta^4} \cdot \sin\left(\frac{\theta}{2}\right) \qquad \text{Eq. (13)}$$

Figure 6B:
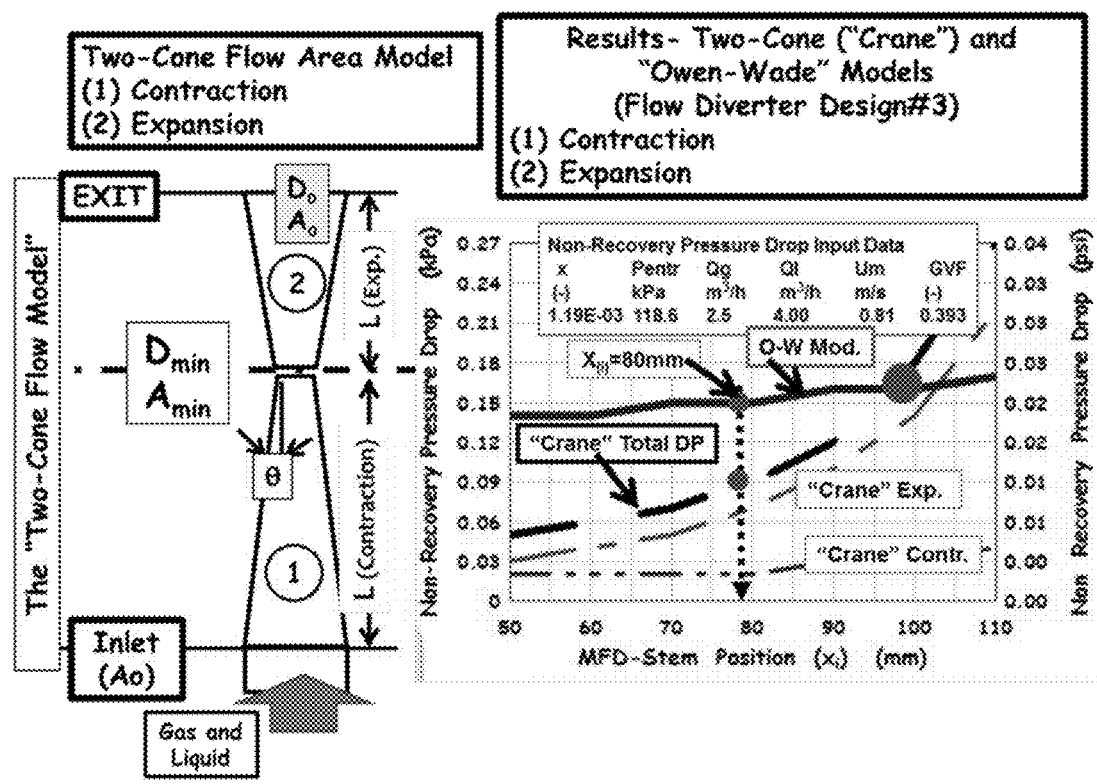
FIG. 6B (right) is an example of a graph prepared for use in the invention, in which non-recovered pressure loss across the movable and stationary flow diverters is calculated for various positions (xi) of the movable flow diverter (and implicitly of the value and position of minimum flow area illustrated by the simplified double-cone flow area model), as evaluated using both "Crane" and "Wade-Owen" calculation models (Example 1). The double-cone simplified flow model (FIG. 6B, left) was used to determine the non-recovery pressure drop for a certain gas and liquid flowrates (FIG. 6B, right, MEDALLION) at various positions of the movable flow diverter (xi).

-continued $$K_{(expansion)} = \frac{2.6 \cdot (1-\beta^2)^2}{\beta^4} \cdot \sin\left(\frac{\theta}{2}\right) \quad \text{Eq. (14)}$$

where the recovery pressure drop value (FIG. 6) is obtained in Pa (or as $h_{mH2O}$ equivalent); where the cone angles ($\beta_{1,2}$; FIG. 5) are separately obtained for the entrance and exit cones as:

Table 2 summarizes geometrical key elements calculated as a double-cone simulating the flow area profile (for example, xi=80 mm; FIG. 5, right; FIG. 6A, left) in the apparatus for movable flow diverter positions xi as x1=30, x2=50 and x3=80 mm (data calculated for the specific flow diagram according to equations 8, 10, and 13-16). The movable flow diverter position (xi) and shape, together with the specific design of stationary flow diverter, impact on positions and size of minimum flow area—a key value considered for the two-cone model used for pressure drop calculation (FIG. 6B).

TABLE 2

Relevant Geometry Model Data (for three positions of movable flow diverter - MFD)

| MFD Position | Ao m² | Do mm | MFD Position | Ao m² | Do mm | MFD Position | Ao m² | Do mm |
|---|---|---|---|---|---|---|---|---|
| xi mm 30 | 0.00193 Amin (m²) 0.00117 | 49.53 A/A min 0.61 | xi mm 50 | 0.00193 Amin (m²) 0.00111 | 49.53 A/A min 0.58 | xi mm 80 | 0.00193 Amin (m²) 0.00098 | 49.53 A/A min 0.51 |
| Ac/Ao (—) 0.61 | Dmin/Do (—) 0.778 | Dmin (mm) 38.54 | Ac/Ao (—) 0.58 | Dmin/Do (—) 0.760 | Dmin (mm) 37.65 | Ac/Ao (—) 0.51 | Dmin/Do (—) 0.714 | Dmin (mm) 35.39 |
| | 1. Lc (mm) 44 | 2. Le (mm) 156.00 | | 1. Lc (mm) 64 | 2. Le (mm) 136.00 | | 1. Lc (mm) 94 | 2. Le (mm) 106.00 |
| | β 0.778 | β 0.778 | | β 0.760 | β 0.760 | | β 0.714 | β 0.714 |
| | θ/2 (rad) 0.12 | θ/2 (rad) 0.04 | | θ/2 (rad) 0.09 | θ/2 (rad) 0.04 | | θ/2 (rad) 0.08 | θ/2 (rad) 0.07 |
| | deg 7.12 | deg 2.02 | | deg 5.30 | deg 2.50 | | deg 4.30 | deg 3.82 |
| | K (contr) 0.11 | K (exp) 0.10 | | K (contr) 0.09 | K (exp) 0.14 | | K (contr) 0.11 | K (exp) 0.33 |

$$\beta = \frac{D_{min}}{D_{(in/ex)}} \quad \text{Eq. (15)}$$

$$\left(\frac{\theta}{2}\right) = \arctan\left[\frac{(D_{in/ex} - D_{min})/2}{L_{(cone)1,2}}\right] \quad \text{Eq. (16)}$$

TABLE 1

Gas-liquid pressure, flowrates and quality (x) - inlet stationary flow diverter (MFD Stem as Case #3)

| $P_{entr}$ kPa | Qg m³/h | Ql m³/h | Um m/s | GVF (—) | x (—) |
|---|---|---|---|---|---|
| 118.69 | 2.59 | 4.00 | 0.81 | 0.39 | 1.19E−03 |

Table 1 (also FIG. 6B, medallion) summarizes the fluid inlet pressure and flowrates for gas (air) and liquid (water) at the apparatus inlet measured conditions (pressure and temperature). The gas-liquid "quality" (x) has been introduced as it is used by the Wade-Owen model and is defined as: x=Gg/(Gg+Gl) as kg/kg, where G indicates the gravimetric flowrate (g—gas, l—liquid). It can be directly related to GVF for known gas-liquid densities and for homogeneous flow only.

Results of calculations indicating the non-recovered pressure drop at different flow diverter positions as (50<xi<80 mm) are illustrated in FIG. 6B. Gas and liquid flowrates at the flow diverter inlet are shown in FIG. 6B (medallion) and, for three fixed positions of movable flow diverter (MFD) as x(i)=30, 50 and 80 mm in Table 2. In addition to "Crane" Double Cone Model (adapted for actual gas-liquid flow), the non-recovered differential pressure across the movable flow diverter and housing was calculated according to Wade (1989, Int. J. Multiphase Flow 15, pp. 241-256) and Owen (1992, Int. J. Multiphase Flow 18, pp. 531-540).

FIG. 6B (right) illustrates the calculated results for non-recovered pressure loss (eq. 11) using a simplified double cone simulated flow area model (FIG. 6B, left), where constants K1,2 (eqs. 13-16; Table 2) are evaluated for each movable flow diverter position (x=50-110 mm—Table 2—extract for x1=30,50 and 80 mm). Results using the adopted Crane model are compared to the Owen-Wade Model (as O-W FIG. 6B, right) (validated for gas-liquid flows) for the same input flow data and simplified flow diverter design (Design #3; Table 1; FIG. 6B, right; Medallion).

For the gas-liquid flowrates considered (as approximately 134.4 CMD or 845 equivalent gas and liquid BBD in a 2" line), the range of calculated non-recovered pressure drop is approximately 0.07-0.28 kPa (0.01-0.04 psi), suggesting a relatively small value for any industrial flow-pressure common flow system. Results from the two models are identical only for the flow diverter position (xi=98 mm); however, they are within the same order of magnitude. The results suggest that the apparatus of the present invention is distinct from any control valve, and that the streamlined flow as a result of particular configuration of the flow diverter and housing substantially eliminates the risk of gas exholution and flow detachment observed during the use of conventional (one-phase) metering equipment for metering the two-phase petroleum flow products. However small, the pressure modifications during minutiae flow diverter displacement may induce errors related to modifications of inlet flowrate, and this was further investigated.

Example 2

A pair metering operation (small displacement of movable flow diverter) was simulated to assess the small displacement effects of movable flow diverter on inducing non-recovery system-pressure variations, and to use the calculated non-recovery pressure variations to assess the potential alterations of flowrates due to modifications of the pressure-flowrate "feeding" the system. The geometry of the apparatus described in Example 1 was used. The "home" position was 80 mm (FIGS. 5, 6) and the pair position was 81 mm (1 mm displacement—The "Design #3" of flow diverter system was adopted—see FIG. 6B (right) calculated non-recovered pressure drop). Table 3 summarizes the modifications of non-recovered pressure drop calculated using the Crane model (Table 3—"Model 1") and the Owen-Wade model (Table 3—"Model 2"), the metering flow area (Ak/Ao) and the respective transport velocity in the metered area (Ak). The input flowrates from Table 2 were used.

TABLE 3

Non-recovered pressure drop, metering area and transport velocity

| Position | DP Model 1 | | DP Model 2 | | Metering Area Ratio and Transport Velocity | | | |
|---|---|---|---|---|---|---|---|---|
| MFD mm | Tot DP kPa | Δ (DP1) Pa = kPa × 1000 | Tot DP kPa | Δ (DP2) Pa = kPa × 1000 | Ak/Ao (—) | Um (k) m/s | D_less (—) | Δ (Um) (—) |
| 80 | 0.0908 | | 0.1508 | | 0.542 | 1.4909 | 0.3516 | |
| 81 | 0.0934 | 2.5993 | 0.1514 | 0.5904 | 0.539 | 1.4975 | 0.3532 | 0.0015 |

Table 3 indicates a modification of non-recovered pressure drop of approximately 0.6 Pa; however small, this may be a potential source of apparatus metering error. To estimate the magnitude of potential inlet flowrate modifications, a centrifugal, industrial (25 HP) liquid pump was assumed to feed the apparatus with liquid.

The effects of small displacements of movable flow diverter (MFD) upon a certain pressure-flowrate system profile were evaluated. The "system" pressure-flowrate profile is found in many engineering applications such as the "pump head versus flowrate characteristic or the reservoir inflow production relationship (or IPR). A baseline inlet liquid flowrate of 4 m$^3$/h was assumed.

The external flow system was introduced through the head-pressure characteristic of an industrial pump. The modifications of pressure drop introduced in the flow system by the apparatus were further used to assess the potential induced changes of system delivered liquid. Eq. 17 is a fair analytical model of head (m H$_2$O) versus pump flowrate Q (m$^3$/h)—as for the arbitrarily selected 25 HP pump:

$$P(\text{head as } m\ H2O) = \sim 0.0032 \cdot Q^2 + 0.1384 \cdot Q + 58.715 \quad \text{Eq. (17)}$$

Eq. 17 simulates the system pressure-flowrate characteristic. Using eq. 17, at a pump head of 59.22 m H$_2$O, the pump discharge would be approximately 4 m$^3$/h. Eq. 17 is further linearized for a small head-flowrate range of interest to obtain (by also inverting variables) an equation describing the flowrate Q as a function of head (or flow resistance in the system) as:

$$y(m^3/h) = a + bx \text{ (Head } mH_2O) \quad \text{Eq. (18)}$$

where the coefficients a=−521.7007 and b=8.8775

The linearization coefficients a, b, are be valid for a range of 4>Q>4.02 m$^3$/h (only). Eq. 18 (as for operation range detail) is further used to assess the potential modifications induced by the change of non-recovery pressure of 0.590 Pa (Table 3), change related to movable flow diverter displacement (from 80 to 81 mm). The calculated differential non-recovery pressure (as in Pa Table 3) is converted to H(mH$_2$O) as:

$$DP(80\text{-}81\ mm):0.590441\ Pa = 5.90441 \times 10^{-5}(mH_2O) \quad \text{Eq. (19)}$$

Using Eq. 18, results indicating expected flowrate modifications during movable flow diverter displacement (80 to 81 mm) are summarized in Table 4:

TABLE 4

Potential errors due to pressure-flowrate "system" alterations during the movable flow diverter advancement from a "home" to a "nearby" metering pair position

| | | Pressure mH$_2$O | Liquid Rate m$^3$/h |
|---|---|---|---|
| Base Line | MFD 80 mm | 59.2174000 | 3.9999963 |
| New MFD | MFD 81 mm | 59.2174590 | 4.0005205 |

TABLE 4-continued

Potential errors due to pressure-flowrate "system" alterations during the movable flow diverter advancement from a "home" to a "nearby" metering pair position System Flowrate Modifications

| | | L/min |
|---|---|---|
| Base Line | Baseline | 66.667 |
| | DQ System | 0.009 |
| Meter Error | % err. | 0.0131 |

The results indicate a potential metering error in the range of 0.013% or 0.009 L/min compared to baseline (4 m$^3$/h or 66.67 L/min). This is considered acceptable for the apparatus operating in an actual liquid feeding pressure-flowrate field installation system.

Previously presented simulated apparatus operation conditions were further used to assess the modifications of PDF values during the implementation of a pair-metering task. The inlet flow data from Example 2 and Table 2 were used. However, this simulation was used to introduce and apply the sensor feature maps and database. The sensor feature maps were obtained using an acceleration sensor of known response property that was exposed to numerous gas-liquid flows of various GVF and broad ranges of gas-liquid transport velocities. During experimental sensor-fluids testing (data not shown), it was found that the repeatability of extracted PDF for the same fluid pair at the same transport velocity (Um) and gas void fraction (GVF) is almost perfect (less than 0.1% error). Data collected were subsequently organized using a three-dimensional (PDF-Um-GVF) data display and used as a base for the sensor reference operation characteristics (ROC) as further introduced by FIGS. 8A-B.

FIG. 7 shows an extracted sensor feature map (also as reference operation characteristic—ROC for constant GVF=0.4 as PDF=F(Um). The GVF was selected to coincide with the input data used for calculating the recovery pressure (Table 2). A U-shaped feature of unique, identifiable position in the PDF-Um map coordinates is a characteristic observed for broad ranges of dimensionless transport velocities (Um). This function is accurately modeled using a cubic fit polynomial equation (FIG. 7, Medallion), analytical formats further used in one embodiment of calculation procedures. The minimum value as PDF≈0.7 suggests that for metered PDFS (as PDF<0.7), there would not be any potential Um solution and the metered section should be reduced by modifying the movable flow diverter position. At the minimum value (as dimensionless velocities Um=0.33), the signal obtained from the acceleration sensor placed in the metered area (as A-A in FIG. 5, left) is most evenly distributed in bins (1000 bins considered as standard for this application). At both higher and lower Um values (only for GVF=0.4), the PDF is higher, indicating an increase of signals collected in the "central bins" (of smaller voltages). At very low dimensionless velocities Um, the PDF approaches PDF=1–a clear sign of approaching the "one fluid-one density only" flowing system and acceleration sensor limitation. At very high values of Um (not observed in FIG. 7 due to sensor flow testing limitations), the PDF approaches again a maximum value close to 1, an effect due to the formation of extremely fine dispersions of gas-liquid systems, that will practically not energize the particular acceleration sensor, and behave as "one phase."

Information from the sensor feature map for PDF=0.4 (FIG. 7) was compared to dimensionless transport velocities (input flow data from Table 2) and PDF's were obtained for the specific configuration of movable flow diverter and housing (or stationary flow diverter) as set out in Table 5.

TABLE 5

The expected PDF variation during movable flow diverter (MFD) displacement

| Position MFD mm | Um D_less (—) | GVF = 0.4 x(MFD) mm | Um (—) | PDF (—) |
|---|---|---|---|---|
| 80 | 0.35163 | 80 | 0.3516345 | 0.71542 |
| 81 | 0.35317 | 81 | 0.3531746 | 0.71563 |
|  |  | Diff (%) | 0.436 | 0.028 |

Table 5 indicates the PDF as calculated from the cubic equation (for given Um values) obtained from ROC for PDF=0.4 (equations in FIG. 7, medallion). The sensor reference operation characteristic (ROC) may be further used to determine (from the indicated cubic equation PDF=F (Um)GVF=0.4) the value of PDF expected for the dimensionless velocities pair. Table 5 also indicates the percentage PDF modifications during the movable flow diverter displacement, suggesting that the accuracy required during the metering operations of the PDFs, must be, particularly high. Um and GVF (implicitly $Q_L$ and $Q_G$) are unknown quantities, with the only available information being the PDF's at a pair of "nearby" metering locations of known displacement values and of known metered area values (simply related to movable flow diverter position and specific apparatus design). The actual metering problem resides in how to use the two PDF metered values, the sensor feature maps, and the flow area modifications for the pair movable flow diverter positions to find the Um and GVF. Example 3 addresses this issue, where the present invention is used to find the transport velocity (Um) and the gas-liquid proportion (GVF) when the PDF is obtained for two "nearby" positions (PDF1, PDF2).

Example 3

A metering case was conducted using a simplified procedure. Demonstrating this procedure requires a valid PDF1, PDF2 pair. The objective was first to generate a measurement pair PDF1 and PDF2 to ensure it was a valid pair and then outline a method of finding Um and GVF from this pair as if it were a measurement pair obtained through an actual measurement. The following information is known:

| | | |
|---|---|---|
| a. | Gas void fraction: | GVF = QG/Qm = 0.4 (—) |
| b. | Gas-liquid transported flowrate | Qm = QG + QL = 2.65 (m3/h) |
| c. | Home position of movable flow diverter (MFD): | x1 = 85 mm |
| d. | The "Nearby" MFD position: | x2 = 86 mm |
| e. | Metering flow areas at positions x1 and x2: | Ak1/Ao = 0.529, Ak2/Ao = 0.527 (—) |

(a relative value of flow area - calculated using the known entrance area Ao = 0.0019 m² of a 2" pipe and the geometry of the movable and stationary flow diverters).

Under the reality of the apparatus metering procedure using data collected from the acceleration sensor with the MFD at position x1 and x2, two salient pieces of information indicated as PDF1 and PDF2 are further calculated as per Eqs. (2) and (3). These will be referred to as measured PDFs.

For this calculation example, in the absence of a tested case, it is assumed first that GVF and the transported gas-liquid flowrate Qm are known quantities, and with known values of pair metering position x1,x2, the values of PDF1,2 (as "seed") are calculated using the sensor map equations. The example will show a methodology of how to find GVF and Um when PDF1,2 are known, using these calculated PDF values. Table 6 summarizes input data. Data introduced at rows #3-#5 are normally available during any metering procedure including a pair of values obtained from the "home" position of movable flow diverter (MFD) at x1=85 mm and the "nearby" MFD position at x2=86 mm (selected arbitrarily).

TABLE 6

Summary of input data for "GLIMS #3" Apparatus Model (Example #3)

| # | | MFD Pos. 1 | MFD Pos. 2 |
|---|---|---|---|
| 1 | Qm = $Q_G$ + $Q_L$ (m³/h) | 2.78 | 2.78 |
| 2 | GVF (—) | 0.4 | 0.4 |
| | | PAIR METERING | |
| | MFD—Mobile Flow Diverter Position | Home mm | Nearby mm |
| 3 | | 85 | 86 |
| 4 | Metering Area Ak/Ao ("GLIMS#3") | 0.52909 | 0.52664 |
| | Gas-Liquid metering area velocity Um Note: for Ao = 0.001927 m² | Um1 m/s | Um2 m/s |
| 5 | (2"-GLIMS #3) | 0.7564 Um1 | 0.7599 Um2 |

TABLE 6-continued

Summary of input data for "GLIMS #3"
Apparatus Model (Example #3)

| # | | MFD Pos. 1 | MFD Pos. 2 |
|---|---|---|---|
| 6 | Normalized meter. area velocity | (—) 0.1719 | (—) 0.1727 |
| | PDF | PDF1 | PDF2 |
| 7.0 | PDF [as F(GVF = 0.4) from "ROC"] | 0.79999 | 0.79923 |
| 7.1 | PDF [for GVF = 0.4 as FIG. 7 Medallon] | 0.80013 | 0.79937 |

Actual and normalized velocities (for the pair MFD positions) can be obtained from the known Qm and the profile of the metered flow area Ak=F(xi) (FIG. 5 "Metered Flow Area" A-A). For the specific design of movable and stationary flow diverter indicated in Table 6 as "GLIMS #3", Ak=F(x1) is thus precisely known for 40<xi<150 mm, where xi is the MFD position in mm. For the pair metering positions, Table 6 indicates the two metered areas in row #4. The anticipated data of transported flow rate (row #1) Qm=2.78 m$^3$/h (for the actual pressure-temperature measured for the metered area Ak) is used to determine the actual transport velocities in the metered area Ak and from the actual the normalized transport velocities by using Um max=4.4 m/s (rows #5 and #6; Table 6).

To calculate the PDF1,2 (row #7; Table 6), the corresponding function PDF=F(Um) for GVF=0.4 (as assumed first, Table 6, row #2) is extracted from the existing "Sensor Feature Map" database (Module #16, FIG. 2). FIG. 7 shows the graph of this extracted function, the cubic equation presented in the medallion being its analytical form. The coefficients of cubic equations in the actual database contain more decimals than shown in the medallion of FIG. 7. Such precise coefficients were used to determine the two PDF values shown in row #7 (Table 6).

Figure 9:
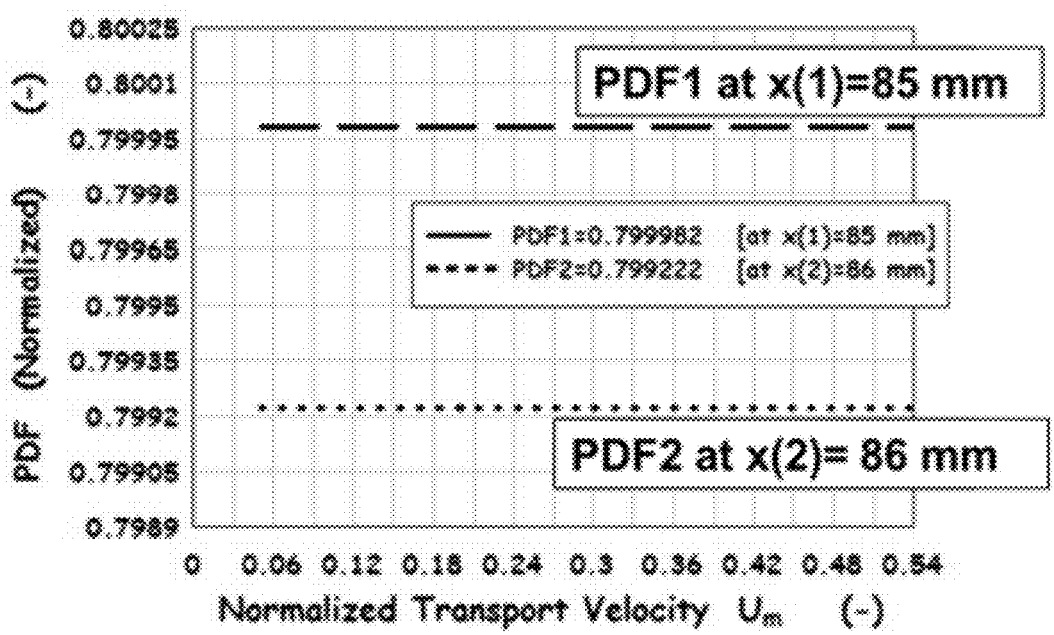
FIG. 9 is an example of a graph extracted from the sensor feature maps through a metering simulation procedure using two transport velocities (Example 2) for use in the invention, in which PDF signal modifications (PDF1, PDF2) with two simulated measurements performed for a simulated small displacement of movable flow diverter (x1, x2) are illustrated to clarify the procedure used for determining the actual transport velocity Um.

FIG. 9, used as a template for Example 3, shows "seeded" PDF1,2 values as constant, horizontal lines in the graph depicting PDF versus a broad arbitrary Um range. Although two PDF values are extremely close, the magnified scale is shown for clarity; however, the PDF, determined through apparatus pair measurements procedures, is a numerical statistical representation of a distribution involving approximately 5 million impulses. The precision is obtainable through data processing, is unrelated to physical units, and can be calculated with a high precision decimal point.

Now that a valid PDF1 and PDF2 pair has been established, the a-priori knowledge of GVF and Qm (Table 6 rows #1,2) values used to analytically determine PDF1,2, can be ignored and one can proceed outlining a method of finding GVF and Um when PDF1 and PDF2 are known measured quantities. The reality of the measurement procedure, at given fluid pressures and fluid temperature, as well as composition of gas and liquid (as determined in the field, with the aid of high-temperature gas chromatography), PDF1,2 and flow areas Ak1,2 at which the two PDF were acquired are precisely known. In addition, the metered procedure makes use of the sensor data base module (#16, FIG. 2) represented for example, by a large group of sensor response cubic equations indicated as PDF=F(Um)$_{(GVF)}$.

This example illustrates one approach for finding the actual GVF and Qm. In order to exemplify numerically the approach used for Qm, GVF determinations, three sensor feature map cubic equations (for GVF=0.2, 0.4 and 0.8) are used and extracted from Module #16 (FIG. 2).

Figure 10A:
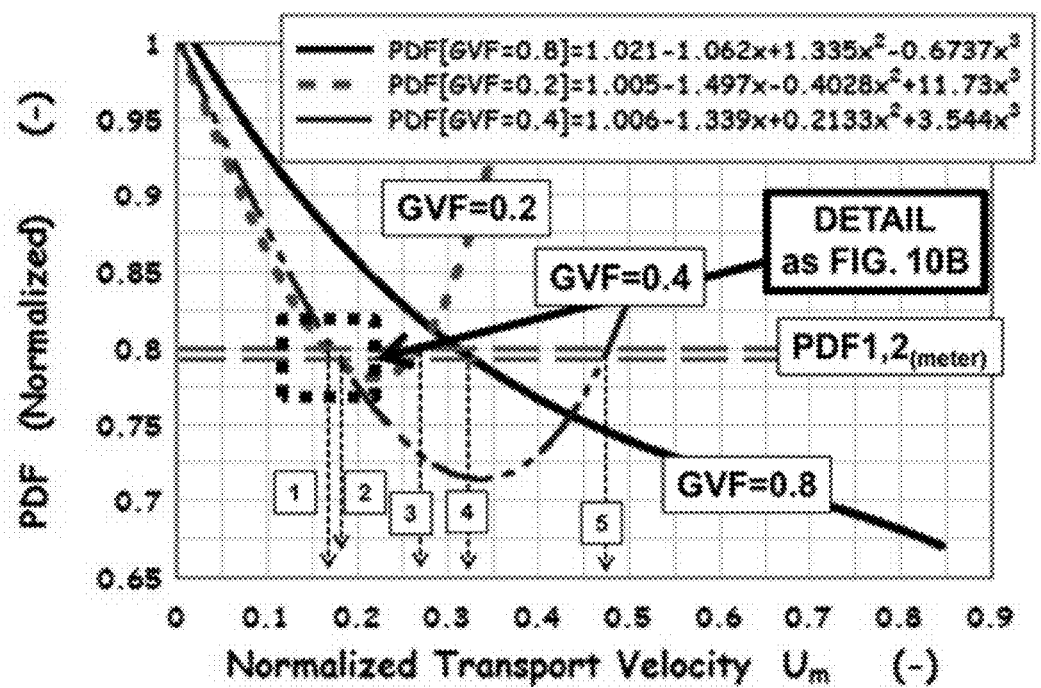
FIG. 10A is an example of a graph extracted from the sensor feature maps for use in the invention, in which PDF=F(Um) for GVF=0.2, 0.4 and 0.8 and the measured PDF for two pair metering locations as x1=85 mm (home position) and x2=86 mm ("nearby").

Using the same Um-PDF co-ordinates as FIG. 9, FIG. 10A is a graphic representation of the three extracted cubic sensor characteristics. For brevity, the PDF=F(Um) for GVF=0.4 coincides with the conditions initially introduced in this example. Even for an extremely reduced number of sensor feature maps, five potential (normalized) transport velocities would be possible (in the range of approximately Um1=0.15 to Um5=0.5). For some "U-Shaped" sensor maps (such as for PDF=0.2 and 0.4) and for the specific PDF1,2 range, there may be two potential solutions.

Through known algebraic operations, knowing the coefficients (C00 . . . C03) of (selected GVF) cubic equations (Module #16, Sensor Feature Map, FIG. 2], and the PDF1,2 values (Table 6, row #7), the analytical solutions (as Um1, 2,3) of the cubic equations are determined by solving Eq. 20:

$$PDF(GVF)=C00+C01\cdot Um+C02\cdot Um^2+C03\cdot Um^3 \quad \text{Eq. (20)}$$

Table 7 is a summary of all potential Um solutions of the three analytical equations used for this example (see also Medallion, FIG. 10A where x=Um).

TABLE 7

Summary of cubic equations solutions
representing potential transport velocities

| MFD (x) | #1, #2 | PDF | GCF | Um11 | Um21 | Um31 |
|---|---|---|---|---|---|---|
| x1 | PDF1 = | 0.79998 | 0.2 | 0.164298 | −0.39747 | 0.267519 |
| x1 | PDF1 = | 0.79998 | 0.4 | 0.171911 | −0.70889 | 0.476807 |
| x1 | PDF1 = | 0.79998 | 0.8 | 0.309823 | img Cmx | img Cmz |

| | | PDF | GVF | Um12 | Um22 | Um32 |
|---|---|---|---|---|---|---|
| x2 | PDF2 = | 0.79922 | 0.2 | 0.165426 | −0.39765 | 0.266566 |
| x2 | PDF2 = | 0.79922 | 0.4 | 0.172710 | −0.70909 | 0.476213 |
| x2 | PDF2 = | 0.79922 | 0.8 | 0.311601 | img Cmx | img Cmz |

Figure 10B:
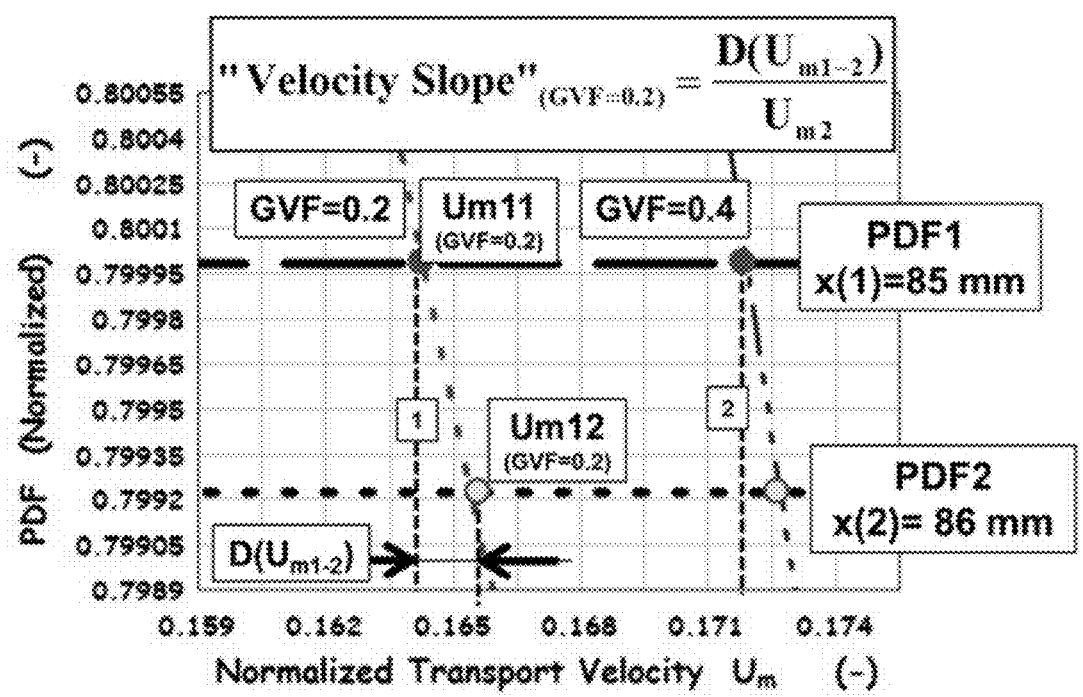
FIG. 10B is an example of a graph detailing a zone of interest from FIG. 10A for use in the invention, in which details indicating the specific "Velocity Slope" points of calculations using potential Um solutions in which PDF=F(Um) for GVF's=0.2 and 0.4 are shown.

As observed in FIG. 10A, each extracted sensor feature map (GVF—specific) curve is distinct as it occupies a different space in the PDF=F(Um) display; intersects the "known" PDF1,2 at a different value of Um (indicated for the example in FIG. 10A as Um1 . . . 5; and each sensor feature curve intersects the PDF1,2 zone indicating a different, yet, apparently unique slope value as ΔPDF1,2/ΔUm1,2 (FIG. 10B).

The potential transport velocities in Table 7 are found at the intersection of PDF1,2 and the three cubic equations for GVF=0.2, 0.4, 0.8—(PDF1,2 and x1,x2 as in FIGS. 9 and 10A). Imaginary and negative solutions obtained analytically, are grayed out in Table 7, leaving a number of five real and positive solutions for each PDF's value (FIG. 10A).

To find the actual transport velocity Um (as a pair solution corresponding to the intersection with PDF1 and PDF2, the constant transport flowrate Qm property is used (Example 1; Eqs. 21a,b,c).

$$Qm1=Qm2; \quad Qm1=Ak1\cdot Um1=Ak2\cdot Um2 \quad \text{Eqs. (21, a,b,c)}$$

The existing sensor feature maps (three sensor feature maps as PDF=F(Um) for GVF=0.2, 0.4 and 0.8) were extracted to illustrate the approach used in Example 3, along with the measured PDF values as in FIG. 10A and Table 7.

Using Eqs. (21 a,b,c), an equality between the relative modification of metered flow areas Ak1,2 and respective transport velocities Um1,2 is illustrated by Eqs. (21a, b):

$$\left[\frac{Um_1}{Um_2}=\frac{Ak_2}{Ak_1}\right]_{at\ GVF,Um\ SOLUTION} \ldots \text{ or } \ldots \quad \text{Eq. (21, a, b)}$$

-continued $$\left[\frac{Um_1 - Um_2}{Um_2} = \frac{Ak_2 - Ak_1}{Ak_1}\right]_{at\,GVF,Um\,SOLUTION}$$

The "pair metering operation characteristic"

$$Cx_{1-2} = \frac{Ak_2 - Ak_1}{Ak_1} \equiv \frac{D(Ak)}{Ak_1} \qquad \text{Eq. (22)}$$

Is used to successively test the validity of equation 21b, for all sensor feature map extracted GVF equations (it could actually be a number in excess of 100 specific GVF's equations but for this example, only three are shown for GVF=0.2, 0.4, 0.8).

Using Eqs. (21a,b), two metering process characteristics are defined as:

"Area Ratio" . . . $Cx(area)=(Ak2-Ak1)/Ak1$  Eq. (23)

"Velocity Ratio" . . . $Cx(velocity)=(Um1-Um2)/Um2$  Eq. (24)

TABLE 6a

Cx ("Area RATIO" as metering area ratios) based on input data presented in Table 6

| | | "Area RATIO" |
|---|---|---|
| 8 | Cx = (Ak2 − Ak1)/Ak1 (%) | −0.462881 |
| 4' | where: Ak2/Ak1 (—) | 0.995371 |

Cx value calculated as ratios of metering areas for a pair metering operation is a function of apparatus design, in this case indicated as "GLIMS#3"—in accordance with data in Table 6 and basic Eq 21b. Cx1-2 (area) value as "Area Ratio"=−0.462881, is further compared to "Velocity Ratios" obtained from Um analytical solutions of cubic (sensor feature) equations GVF=0.2, 0.4 and 0.8 for PDF1 and PDF2 (Table 7).

Table 8 is a summary of calculated "Velocity Ratios" for the pair PDF's (as PDF1,2) using the pair Um's solution values summarized in Table 7 and definition equation 23. In order to find the actual Um (and implicitly the attached GVF), a search operation is performed by comparing the "Area Ratio with all possible "Velocity Ratios" values (Table 8) (five "potential" solutions).

TABLE 8

Summary of calculated "Velocity Ratios"

| GVF | (Um1 − Um2)/Um2 (%) | | |
|---|---|---|---|
| 0.2 | −0.681365 | n/a | 0.3578314 |
| 0.4 | −0.462882 | n/a | 0.1247982 |
| 0.8 | −0.570687 | n/a | n/a |

Table 9 summarizes "Velocity Ratios" (as have been illustrated by Table 8) and the differential "ratios" used to find the most appropriate GVF and Um solutions. For this example limited to only three sensor feature maps/curves and using a precise calculations (only six decimal digits illustrated), a perfect match is obtained for GVF=0.4 (which is to be expected—since GVF=0.4 was used in conjunction with Qm=2.78 m³/h (Table 6) to create "seed" values to ultimately determine two valid PDF1,2).

TABLE 9

Comparison of calculated "Velocity Ratios" and comparison with the target "Area Ratio" for searching the actual GVF and transport velocity Um (Um data Table 7)

| | "Velocity Ratio" (Um1 − Um2)/Um2 (%) | | | | Reference Area Ratio −0.462881 | Differences (AR − VR)/AR | |
|---|---|---|---|---|---|---|---|
| GVF | (—) | (—) | (—) | GVF | % | % | % |
| 0.2 | −0.681365 | n/a | 0.3578314 | 0.2 | −47.20 | n/a | 177.31 |
| 0.4 | −0.462882 | n/a | 0.1247982 | 0.4 | 0.00 | n/a | 126.96 |
| 0.8 | −0.570687 | n/a | n/a | 0.8 | −23.29 | n/a | n/a |

During actual field measurements, errors are introduced due to both internal (or apparatus- and procedure related) and external or field-related conditions. Finding the actual GVF and transported velocity Um is subject to imposing an acceptable error value "ERR" as in Eq. (25):

ERR (%)<[Reference Area Ratio]−[Velocity Ratio]  Eq. (25)

(as per all Um solutions of GVF=0 . . . 1 sensor feature equations)

Example 4

A summary of metered and calculated steps (from a deemed acceptable metering pair $x_1, x_2$) follows:
1. Assess and store the PDF values (PDF1,2) measured at $x_1$ and $x_2$.
2. For (known) $x_1.x_2$ values and the apparatus design dimensions, calculate the relative area flow modification as:

$$\left[\frac{\Delta(Ak)_{(1-2)}}{Ak_1}\right] \qquad \text{Eq. (26)}$$

3. Extract from the existing sensor feature map database all available "n" cubic equations (for GVF=0.05 . . . 0.95) and eliminate all cubic equations that have a "U-shaped" form with a known minimum value of PDFmin for which PDFmin>PDF1, 2, as these equations will not yield a solution because PDF1 and PDF2 do not intersect the curve.
4. Successively obtain all potential Um solutions (positive, real) from equations:

$F(Um)_{GVF}$–PDF1=0 and  (a)

$F(Um)_{GVF}$–PDF2 and organize all 2·n solutions as in Table 7 (which, for simplicity was built for three cubic equations and six possible solutions only).  (b)

5. Compare the relative modification of flow area (indicated as "Area Ratio" for specific example in Table 6a) with relative variation of potential transport velocities as obtained from 2*n extracted sensor feature maps (indicated as "Velocity Ratio" for specific example in Table 9) subject to the acceptable accuracy given by Eq. (24).
6. Assign the obtained solution (as for critical error related to apparatus and field metering conditions) to the particular GVF extracted sensor characteristic (as PDF=F(Um)GVF). Using the Um respective solution, calculate the actual flow-rates and then convert them for standard P,T conditions using customary accepted thermodynamic (PVT) correlations.
7. Assess the solution validity and display on an external graphic user interface.

What is claimed is:

1. A method for determining a property of a flowing multiphase fluid comprising the steps of:
   (a) directing the multiphase fluid through an apparatus comprising:
   a body comprising an entrance for directing the multiphase fluid, and an exit for discharging the multiphase fluid and defining a flow passage between the entrance and the exit for directing the flow of the multiphase fluid therethrough; and
   a flow diverter assembly comprising a stationary housing disposed downstream of the entrance; and a movable flow diverter movable towards, within, or away from the stationary housing, the stationary housing and the movable flow diverter together defining a metering flow area and guiding the flow of the multiphase fluid towards and out of the metering area;
   (b) positioning the movable flow diverter at a home position;
   (c) monitoring the multiphase fluid with at least one monitoring device in communication with the metering flow area to obtain a signal representing the property of the multiphase fluid;
   (d) determining a value of the property of the multiphase fluid by comparing the signal with a set of sensor feature maps;
   (e) adjusting the movable flow diverter by predetermined increments proximate to the home position to obtain a first pair of reference signals, and comparing the reference signals with the set of sensor feature maps to determine values of the property of the multiphase fluid;
   (f) comparing the value obtained in step (d) with the values obtained in step (e); and
   (g) based on the comparison, continuously monitoring the multiphase fluid, or re-adjusting the position of the movable flow diverter within or away from the stationary housing to obtain a new home position and suitable metering conditions in the metering area.

2. The method of claim 1, wherein in step (e), the first pair of reference signals is generated by:
   setting the movable flow diverter in a first position and monitoring the fluid with the at least one monitoring device to obtain a first reference signal representing the property of the multiphase fluid; and
   setting the movable flow diverter in a second position and monitoring the fluid with at least one monitoring device to obtain a second reference signal representing the property of the multiphase fluid;
   wherein the home position is median to the first position and the second position.

3. The method of claim 2, wherein in step (g), setting suitable metering conditions in the metering area is conducted by adjusting the movable flow diverter to a new home position; monitoring the multiphase fluid with the at least one monitoring device to obtain a signal representing the property of the multiphase fluid; and determining a value of the property of the multiphase fluid by comparing the signal with a set of sensor feature maps.

4. The method of claim 3, further comprising adjusting the movable flow diverter by increments proximate to the new home position to obtain a second pair of reference signals, and comparing the reference signals with the set of sensor feature maps to determine values of the property of the multiphase fluid.

5. The method of claim 4, wherein the second pair of reference signals is generated by:
   setting the movable flow diverter in a third position and monitoring the fluid with the at least one monitoring device to obtain a third reference signal representing the property of the multiphase fluid; and
   setting the movable flow diverter in a fourth position and monitoring the fluid with the at least one monitoring device to obtain a fourth reference signal representing the property of the multiphase fluid;
   wherein the new home position is median to the third position and the fourth position.

6. The method of claim 4, further comprising comparing the values obtained with the movable flow diverter at the new home position with the values obtained from the second pair of reference signals; and based on the comparison, continuously monitoring the multiphase fluid, or re-adjusting the position of the movable flow diverter within the flow passage to obtain suitable metering conditions in the metering area.

7. The method of claim 1, wherein the multiphase fluid comprises a gas phase and a liquid phase and wherein the property of the multiphase fluid to be determined is a measure of the total transport velocity and relative proportions of the gas phase and the liquid phase expressed as gas void fraction contained in the multiphase fluid.

8. The method of claim 7, wherein the transport velocity and gas void fraction are derived from at least, two pressure oscillation signals obtained from an acceleration transducer.

9. The method of claim 8, wherein deriving the transport velocity and gas void fraction comprises the steps of:
   creating a set of data points from the signal;
   developing a set of probability density functions of the signal; and
   obtaining the value for the property from the set of probability density functions.

10. The method of claim 9, wherein the probability density function is selected from:
   i) the maximum probability density value expressed as $PDF_{max}$;
   ii) a difference in a value of the $PDF_{max}$ between transport velocities obtained from the pairs of reference positions; and
   iii) a derivative expressed as $D(PDF)/D(x_i)$.

* * * * *

UNITED STATES PATENT AND TRADEMARK OFFICE
CERTIFICATE OF CORRECTION

PATENT NO. : 10,274,354 B2
APPLICATION NO. : 15/492444
DATED : April 30, 2019
INVENTOR(S) : Peter Toma et al.

Page 1 of 1

It is certified that error appears in the above-identified patent and that said Letters Patent is hereby corrected as shown below:

In the Specification

1. Column 14, Line 11, Change "$Q_G = GVF \cdot U_m * A_{flow}$" to --$Q_G = GVF \cdot U_m \cdot A_{flow}$--
2. Column 28, Line 56, Change "$2*n$" to --$2 \cdot n$--

Signed and Sealed this
Fifth Day of May, 2020

Andrei Iancu
*Director of the United States Patent and Trademark Office*